United States Patent
Silvers et al.

(10) Patent No.: US 10,471,642 B2
(45) Date of Patent: Nov. 12, 2019

(54) PET CONTAINERS WITH ENHANCED THERMAL PROPERTIES AND PROCESS FOR MAKING SAME

(71) Applicant: Graham Packaging PET Technologies Inc., Lancaster, PA (US)

(72) Inventors: Kerry W. Silvers, Campbellsburg, IN (US); Mark D. Schneider, Saint Charles, IL (US); Sergey B. Bobrov, Aurora, IL (US); Samuel E. Evins, Olathe, KS (US)

(73) Assignee: Graham Packaging PET Technologies Inc., Lancaster, PA (US)

( * ) Notice: Subject to any disclaimer, the term of this patent is extended or adjusted under 35 U.S.C. 154(b) by 747 days.

(21) Appl. No.: 14/677,480

(22) Filed: Apr. 2, 2015

(65) Prior Publication Data
US 2015/0209996 A1    Jul. 30, 2015

Related U.S. Application Data

(60) Division of application No. 13/250,189, filed on Sep. 30, 2011, now Pat. No. 9,023,446, which is a
(Continued)

(51) Int. Cl.
   *B29C 49/06*     (2006.01)
   *B29C 49/00*     (2006.01)
   (Continued)

(52) U.S. Cl.
   CPC ........ *B29C 49/061* (2013.01); *B29C 49/0005* (2013.01); *B29C 49/16* (2013.01);
   (Continued)

(58) Field of Classification Search
   None
   See application file for complete search history.

(56) References Cited

U.S. PATENT DOCUMENTS 4,140,468 A  *  2/1979  Duga .................... B29C 49/062
                                              425/534
4,233,022 A     11/1980  Brady et al.
(Continued)

FOREIGN PATENT DOCUMENTS

CN        85101194 A     10/1986
CN         1159975 A      9/1997
(Continued)

OTHER PUBLICATIONS

"Vitrification and devitrification of the rigid amorphous fraction in poly(ethylene terephthalate)" Maria Cristina Righetti and Maria Laura Di Lorenzo, e-polymers May 2009, No. 053, http://www.e-polymers.org (http://www.e-polymers.org/journal/papers/mcrighetti_310509.pdf) ISSN 1618-7229.
(Continued)

*Primary Examiner* — Monica A Huson
(74) *Attorney, Agent, or Firm* — Stradley Ronon Stevens & Young, LLP

(57) ABSTRACT

A process is provided for making a blow-molded PET container comprising a wall having a density of between about 1.370 g/cc and 1.385 g/cc, a heat-induced crystallinity of from about 18% to about 25%, and a strain-induced crystallinity of from about 55% to about 75%, wherein the PET container, when filled with a liquid having a temperature of from about 100° C. to about 132° C. or when subjected to a pasteurization or retort process, will not experience a change in volume of greater than 3%.

43 Claims, 20 Drawing Sheets

Related U.S. Application Data continuation-in-part of application No. 12/564,845, filed on Sep. 22, 2009, now Pat. No. 8,507,063.

(60) Provisional application No. 61/424,558, filed on Dec. 17, 2010.

(51) Int. Cl.

| | |
|---|---|
| *B29C 49/66* | (2006.01) |
| *B65D 1/10* | (2006.01) |
| *B65D 1/16* | (2006.01) |
| *B29C 49/16* | (2006.01) |
| *B29C 49/18* | (2006.01) |
| *B29C 49/48* | (2006.01) |
| *B29C 49/64* | (2006.01) |
| *B29C 49/78* | (2006.01) |
| *B29C 70/04* | (2006.01) |
| *B65D 1/02* | (2006.01) |
| *B29K 67/00* | (2006.01) |
| *B29L 31/00* | (2006.01) |
| *B29C 49/12* | (2006.01) |
| *B29C 49/42* | (2006.01) |

(52) U.S. Cl.
CPC ............ *B29C 49/18* (2013.01); *B29C 49/185* (2013.01); *B29C 49/4823* (2013.01); *B29C 49/6481* (2013.01); *B29C 49/66* (2013.01); *B29C 49/783* (2013.01); *B29C 70/04* (2013.01); *B65D 1/0207* (2013.01); *B65D 1/10* (2013.01); *B65D 1/165* (2013.01); *B29C 49/06* (2013.01); *B29C 49/12* (2013.01); *B29C 49/4205* (2013.01); *B29C 2049/4846* (2013.01); *B29C 2049/4889* (2013.01); *B29K 2067/00* (2013.01); *B29K 2067/003* (2013.01); *B29K 2995/004* (2013.01); *B29K 2995/0063* (2013.01); *B29L 2031/712* (2013.01); *B29L 2031/716* (2013.01); *Y10T 428/13* (2015.01); *Y10T 428/1303* (2015.01); *Y10T 428/139* (2015.01); *Y10T 428/1352* (2015.01); *Y10T 428/1359* (2015.01); *Y10T 428/1397* (2015.01)

(56) References Cited

U.S. PATENT DOCUMENTS

| | | |
|---|---|---|
| 4,357,296 A | 11/1982 | Hafele |
| 4,476,170 A | 10/1984 | Jabarin |
| 4,512,948 A | 4/1985 | Jabarin |
| 4,522,779 A | 6/1985 | Jabarin |
| 4,535,025 A | 8/1985 | Jabarin |
| 4,603,066 A | 7/1986 | Jabarin |
| 4,713,270 A | 12/1987 | Jabarin et al. |
| 4,790,741 A | 12/1988 | Takakusaki et al. |
| 4,839,127 A | 6/1989 | Ajmera et al. |
| 4,891,178 A | 1/1990 | Ajmera et al. |
| 5,500,261 A | 3/1996 | Takei et al. |
| 5,501,590 A | 3/1996 | Orimoto et al. |
| 5,562,960 A | 10/1996 | Sugiura |
| 5,829,614 A | 11/1998 | Collette et al. |
| 6,464,683 B1 | 10/2002 | Samuelson et al. |
| 6,485,669 B1 | 11/2002 | Boyd et al. |
| 6,485,670 B1 | 11/2002 | Boyd et al. |
| 6,514,451 B1 | 2/2003 | Boyd et al. |
| 6,749,415 B2 | 6/2004 | Boyd et al. |
| 6,767,197 B2 | 7/2004 | Boyd et al. |
| 6,841,117 B1 | 1/2005 | Smith et al. |
| 7,033,656 B2 | 4/2006 | Nahill et al. |
| 7,157,139 B2 | 1/2007 | Salsman et al. |
| 8,394,476 B2 | 3/2013 | Hama et al. |
| 8,507,063 B2 | 8/2013 | Schneider et al. |
| 2001/0017429 A1 | 8/2001 | Takahashi et al. |
| 2003/0186006 A1 | 10/2003 | Schmidt et al. |
| 2005/0136149 A1 | 6/2005 | Krishnakumar et al. |
| 2005/0140036 A1 | 6/2005 | Hirota et al. |
| 2006/0293421 A1 | 12/2006 | Reitz et al. |
| 2007/0047080 A1 | 3/2007 | Stover et al. |
| 2007/0065615 A1 | 3/2007 | Odle et al. |
| 2007/0244550 A1 | 10/2007 | Eidenschink |
| 2011/0204067 A1 | 8/2011 | Schneider et al. |

FOREIGN PATENT DOCUMENTS

| | | |
|---|---|---|
| CN | 1805991 A | 7/2006 |
| EP | 0559103 | 9/1993 |
| EP | 0860265 | 8/1998 |
| EP | 1155807 | 11/2001 |
| EP | 0764514 B1 | 2/2002 |
| EP | 1 208 957 | 5/2002 |
| GB | 2108899 | 5/1993 |
| JP | 62-71622 | 4/1987 |
| JP | H10286874 A | 10/1998 |
| WO | 97/32708 | 9/1997 |
| WO | 2001/96448 | 12/2001 |
| WO | 2004/113414 A1 | 12/2004 |
| WO | 2008/016114 | 2/2008 |
| WO | 2011/037792 A1 | 3/2011 |

OTHER PUBLICATIONS

International Search Report and Written Opinion dated Oct. 22, 2013 by the European Patent Office as International Searching Authority for corresponding International Patent Application No. PCT/US2011/065118.

Timothy J. Boyd, A Dissertation entitled "Transient Crystallization of Poly (ethylene terephthalate) Bottles", The University of Toledo Aug. 2004.

\* cited by examiner

PET CONTAINERS WITH ENHANCED THERMAL PROPERTIES AND PROCESS FOR MAKING SAME

CROSS-REFERENCES TO RELATED APPLICATIONS

This application is a divisional of U.S. patent application Ser. No. 13/250,189 filed Sep. 30, 2011 which claims the benefit under 35 U.S.C. § 119(e) to provisional U.S. Patent Application No. 61/424,558 filed Dec. 17, 2010, and which is also a continuation-in-part of U.S. patent application Ser. No. 12/564,845, filed on Sep. 22, 2009, now U.S. Pat. No. 8,507,063, the entire disclosures of which are incorporated by reference herein.

BACKGROUND OF THE INVENTION

Technical Field of the Invention

The present invention relates to plastic containers having enhanced thermal properties that allows them to be used in applications where the contents is a fluid, or paste, or solid, or combination of such, and comprises water or water based solutes that is heated up to the boiling point of a fluid, or oil, or oil based recipes that is heated up to 250° F. The present invention also relates to containers having enhanced thermal properties that allows them to be used at up to 270° F. in applications where a filled container is exposed to sterilization, pasteurization or retort processes. The present invention also relates to a process of manufacturing such plastic containers that result in enhanced thermal properties.

Background Art

Blow molding processes for forming PET containers are well known in the art. PET plastic containers have replaced or provided an alternative to glass containers for many applications. However, few food products that must be processed using pasteurization or retort are available in plastic containers. Pasteurization and retort methods are frequently used for sterilizing solid or semi-solid food products, e.g., pickles and sauerkraut. The products may be packed into the container along with a liquid at a temperature less than 82° C. (180° F.) and then sealed and capped, or the product may be placed in the container that is then filled with liquid, which may have been previously heated, and the entire contents of the sealed and capped container are subsequently heated to a higher temperature. As used herein, "high-temperature" pasteurization and retort are sterilization processes in which the product is exposed to temperatures greater than about 80° C.

Pasteurization and retort differ from hot-fill processing by including heating the filled container to a specified temperature, typically greater than 93° C. (200° F.), until the contents of the filled container reach a specified temperature, for example 80° C. (175° F.), for a predetermined length of time. That is, the external temperature of the hot-filled container may be greater than 93° C. so that the internal temperature of a solid or semi-solid product reaches approximately 80° C. Retort processes also involve applying overpressure to the container. The rigors of such processing present significant challenges for the use of plastic containers, including containers designed for use in hot-fill processing. For example, during a retort process, when a plastic container is subjected to relatively high temperatures and pressures, the plastic container's shape will distort. Upon cooling, the plastic container generally retains this distorted shape or at least fails to return to its pre-retort shape.

Prior art efforts to increase the thermal performance of PET containers have focused on increasing the crystallinity levels of PET. PET is a crystallizable polymer meaning that its crystallinity can be manipulated by the process of forming articles from the PET. These efforts have been successful to the extent of forming PET containers capable of withstanding temperatures up to 97° C. (207° F.) but not much beyond.

A two-phase model of PET morphology states that PET molecules can exist in two phases: an amorphous phase and a crystalline phase. The amorphous phase has been described on a molecular level as resembling a sporadic or chaotic formation that is lack of order. In a solid state the molecule motion belongs to amorphous phase is restricted to very short range vibrations and rotations that is also characterized by a level of energy required to achieve morphing transformation after the distinct energy is delivered. In the molten state there is considerable segmental motion arising from rotation about chemical bonds. In the crystalline phase, the polymer chains arrange themselves in the orderly alignment with greater capacity, energy wise. Crystalline portions of the PET molecules can extend straight in one direction and then fold back and forth numerous times to form a folded structure. Numerous such folded structures can stack to form more complex structures known as lamellae. Further crystallized, the lamellae can form globules with even greater energy capacity, but at the cost of being completely opaque.

A three-phase model of PET has also been proposed to account for deficiencies observed in the two-phase model. The three phase model includes a (1) crystalline phase, (2) a rigid amorphous phase, and (3) a mobile amorphous phase. One article describing the three-phase model is "Vitrification and Devitrification of the Rigid Amorphous Fraction in poly(ethylene terephthalate)" by Maria Cristina Righetti and Maria Laura Di Lorenzo published at e-polymers.org in 2009, the disclosure of which is incorporated herein in its entirety.

Three commonly known methods for increasing the crystalline fraction of PET include quiescent crystallization, strain-induced crystallization, and a combination thereof. Quiescent crystallization requires exposing an amorphous PET article to heat above the glass transition temperature of PET (70° C. or 158° F.) at the very slow heating rate to impart mobility into the polymer chains, which allows them to reorganize into a crystalline morphology. This is also known as "cold crystallization." Strain-induced crystallization requires stretching of the PET under proper heat and extension ratios to orient the PET molecules into an organized matrix. An example of strain-induced crystallization is when a preform (a test tube shaped article) is blown into a mold of greater volume to cause stretching of the preform in a single direction or in multiple directions. Articles with strain-induced crystallinity can be exposed to heat in a process known as heat setting or thermal annealing to cause a relaxation in the stressed-induced crystallinity to increase the thermal properties of the final article. The prior art discloses that the orientation of the polymer chains creates a condition where crystal formation is kinetically favorable upon application of thermal energy. This statement is only applicable to a case where a heated article, for example, loses its transparency as a result of development of heat-induced lamellae and globules.

Prior art efforts to increase the thermal performance of PET containers have focused on increasing the crystallinity levels of PET. PET is a crystallizable polymer meaning that its crystallinity can be manipulated by the process of forming articles from the PET. These efforts have been successful to the extent of forming PET containers capable of withstanding temperatures up to 97° C. (207° F.) but not much beyond. The following summarizes such efforts.

U.S. Pat. Nos. 4,476,170; 4,512,948; 4,522,779; 4,535,025; 4,603,066; 4,713,270; 4,839,127 and 4,891,178 to Jabarin ("the Jabarin patents") disclose single mold systems for forming PET containers. The Jabarin patents disclose using mold temperatures of up to 250° C. (482° F.) to form containers having crystallinity of up to 60%. Removing the finished containers from such molds without shrinkage of the containers requires either lowering the temperature of the mold to a point where the containers are self-sustaining and can be removed or applying internal pressure to the container when removing the container until the container cools to a temperature where the container is self-sustaining. Neither of these techniques were commercially feasible, however, because the first technique would require extremely long cycle times and the second would be difficult to control in commercial applications.

U.S. Pat. Nos. 5,562,960 and 5,501,590 disclose two-mold systems for forming PET containers known as a dual-blow system. Those patents require forming an intermediate article in a first mold having a volume greater than the finished container, conveying the intermediate article through a shrink oven to crystallize the intermediate article and then placing the intermediate article into a second mold where it is blown into the finished article. Containers formed from this method have reported crystallinity from 40-50%.

U.S. Pat. Nos. 6,485,669; 6,485,670; 6,514,451; 6,749,415 and 6,767,197 ("the Boyd patents") and the Boyd Dissertation disclose that the minimum amount of cooling during the blow molding process and the higher the temperature at de-molding leads to the higher thermal properties of the finished article. The Boyd patents disclose blowing heated air, hot air annealing, or a combination of heated air and fluid onto the inner surface of an article in a blow mold to increase the thermal properties of the finished article.

Commercial techniques for forming PET utilize both threaded and unthreaded preforms. Preforms are essentially amorphous having less than about 5% crystallinity. Upon blow molding a threaded preform into an expanded article the threads will have substantially the same dimension in the finished article as the preform, and, therefore, will have little if any strain induced crystallization. Such a finish will be susceptible to softening and deformation under hot fill conditions. Thus, some amount of crystallization must be imparted to the finish section to enhance thermal performance without shrinking the finish and without imparting whitening to the finish. U.S. Pat. No. 7,033,656 discloses a method for crystallizing the finish section in such a way that one surface is crystallized throughout its length and the other surface includes an area that is essentially uncrystallized with crystallization in a mid-portion of the finish being graded between the surfaces.

U.S. Pat. No. 4,233,022 discloses an apparatus for forming a PET container from a threaded preform. This patent states that due to the low orientation of the finish and the heel of the container during blow molding that it is undesirable to heat set these areas as it would create whitening in these areas by creating spherulitic crystallinity. Thus, this patent discloses a blow station that selectively heats the strain-oriented sections of the container and cooling the portions of the container having little or no strain orientation.

U.S. Pat. No. 6,841,117 discloses a method for blow molding a container from a threadless preform. The method includes the step of blow molding a preheated, threadless preform in a heated mold having threads of the desired size to form an intermediate container having threads. The intermediate container has a moil section above the threaded finish which is cut from the intermediate container to form the final container. The finish will have a desired crystallinity of 25% to provide sufficient thermal properties for hot fill applications. More particularly, the preform is preheated to a temperature of 108° C. and then disposed within a mold cavity maintained at temperatures from 138 to about 143° C. The portion of the mold cavity forming the bottom of the container is maintained at 49 to about 54° C. After the mold is closed the preform is blown with air pressure of 40 bar for 1.5 to 3 seconds. A stretch cooling rod blows recirculating cooling gas at a temperature from about 20 to about 40° C. inside the container in the region of the blown threads. The container is removed from the mold at below about 80° C.

Despite these developments, the packaging industry still has to turn to metal or glass containers for applications that require temperatures up to 270° F. in applications where a filled container is exposed to sterilization, pasteurization or retort processes. Accordingly, there remains a need to provide PET plastic containers that can withstand such extreme conditions associated with pasteurization and retort processing in order to take advantage of the cost savings that can be realized through manufacture and recycling.

SUMMARY OF THE INVENTION

In one aspect, the present invention provides a process for forming a blow molded PET plastic container having enhanced thermal properties, the process comprising the steps of, on an integrated system: injecting a molten PET resin into an injection mold cavity to form a preform; removing the preform while the preform is at a temperature of from about 75° C. to about 130° C.; conveying the preform to at least one conditioning station at a rate such that the temperature of the surface of the preform does not decrease more than 5° C.; conditioning the preform by selectively heating at least one portion of the preform selected from the group consisting of: neck forming portion, barrel forming portion, base forming portion, and heel forming portion, to define a conditioned preform; conveying the conditioned preform to a blow mold station at a rate such that the temperature of the surface of the preform does not decrease more than 5° C.; inserting the conditioned preform into a blow mold having walls that define a blow cavity that defines a shape of a finished article, wherein the mold has at least three temperature zones along an axis of the mold all of which are above the glass transition temperature of PET; blowing the preform into a finished PET container by a stretch blow molding process comprising the steps of: i. inserting an elongated stretch blow rod into the conditioned preform to contact a bottom portion of the conditioned preform thereby providing a downward pressure to stretch the conditioned preform to a base portion of the mold; ii. simultaneously injecting low pressure air into the conditioned preform at a pressure of from about 100 psi to about 200 psi to form a pre-blown preform; and iii. immediately after ii, injecting high pressure air at a pressure of from about 400 psi to 600 psi into the pre-blown preform to expand the pre-blown preform against the mold walls to form the finished container; holding the finished container in the mold for a time period of from about 2 seconds to about 20 seconds; releasing the finished container from the mold wherein the temperature of the finished container is from about 80° C. to about 125° C.; and allowing the finished container to cool to ambient temperature.

In another aspect, the present invention provides a process for forming a blow molded PET plastic container having enhanced thermal properties, the process comprising the steps of, on an integrated system: injecting a molten PET resin into an injection mold cavity to form a preform; removing the preform while the preform is at a temperature of from about 75° C. to about 130° C.; conveying the preform to at least one conditioning station at a rate such that the temperature of the surface of the preform does not decrease more than 5° C.; conditioning the preform by selectively heating at least one portion of the preform selected from the group consisting of: neck forming portion, barrel forming portion, base forming portion, and heel forming portion, to define a conditioned preform; conveying the conditioned preform to a first blow mold station at a rate such that the temperature of the surface of the preform does not decrease more than 5° C.; inserting the conditioned preform into a first blow mold having walls that define a blow cavity that defines a shape of a finished article and a first volume, wherein the first mold has at least three temperature zones along an axis of the first mold all of which are above the glass transition temperature of PET; blowing the preform into a finished PET container by a stretch blow molding process comprising the steps of: i) inserting an elongated stretch blow rod into the conditioned preform to contact a bottom portion of the conditioned preform thereby providing a downward pressure to stretch the conditioned preform to a base portion of the first mold; ii) simultaneously injecting low pressure air into the conditioned preform at a pressure of from about 100 psi to about 200 psi to form a pre-blown preform; and iii) immediately after ii, injecting high pressure air at a pressure of from about 400 psi to 600 psi into the pre-blown preform to expand the pre-blown preform against the walls of the first mold to form an intermediate container; iv) holding the intermediate container in the mold for a time period of from about 2 seconds to about 20 seconds; v) releasing the intermediate container from the mold wherein the temperature of the finished container is from about 80° C. to about 125° C.; vi) conveying the intermediate container to a second mold having walls that define a blow cavity that defines a shape of a finished article and a second volume, wherein the second mold has at least three temperature zones along an axis of the second mold all of which are above the glass transition temperature of PET, and wherein the second volume is the same as the first volume; vii) inserting an elongated stretch blow rod into the intermediate container to contact a bottom portion of the intermediate container thereby providing a downward pressure to stretch the intermediate container to a base portion of the first mold and injecting high pressure air at a pressure of from about 400 psi to 600 psi into the intermediate container to expand the intermediate container against the walls of the second mold to form the finished container; viii) directing a cooling fluid to an inner surface of the finished container; ix) releasing the finished container from the second mold, wherein the finished container is at a temperature of from about 80° C. to about 170° C.; and x) allowing the finished container to cool to ambient temperature.

In yet another aspect, the present invention provides a blow-molded PET container comprising a wall having a density of between about 1.370 g/cc and 1.385 g/cc, a heat-induced crystallinity of from about 18% to about 25%, and a strain-induced crystallinity of from about 55% to about 75%, wherein the PET container, when filled with a liquid having a temperature of from about 100° C. to about 132° C., will not experience a change in volume of greater than about 3%. Such containers exhibit excellent transparency.

In yet another aspect, the present invention provides a blow-molded PET container comprising a wall having a reduced capacity to absorb moisture from ambient fluids by about 24% compared to the same polymer composition converted into container by conventional methods and having improved tensile properties measured along the wall of the container that when filled with a liquid having a temperature of from 100° C. to about 132° C., will not experience a change in volume of greater than about 3%.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention. All references cited herein are incorporated by reference as if each had been individually incorporated.

The present invention provides a container made of a polyester resin such as, for example, poly(ethylene)terephthalate (PET), having enhanced thermal properties while still providing a container with high clarity. Suitable polyester resins include, for example, homopolymers of poly(ethylene)-phthalate, copolymers of poly(ethylene)terephthalate, poly(ethylene)isophthalate, poly(ethylene) naphthalate, and poly(dimethylene)terephthalate, poly(butylene)terephthalate. In preferred embodiments, the containers of the present invention comprise PET. Preferably, the PET has an intrinsic viscosity of from about 0.72 dL/g to about 0.86 dL/g. Suitable PET resins include bottle grade PET resins such as, for example, any of the PARASTAR® resins sold by the Eastman Chemical Company, and CLEAR TUF® resins sold by M&G Polymers.

Figure 1:
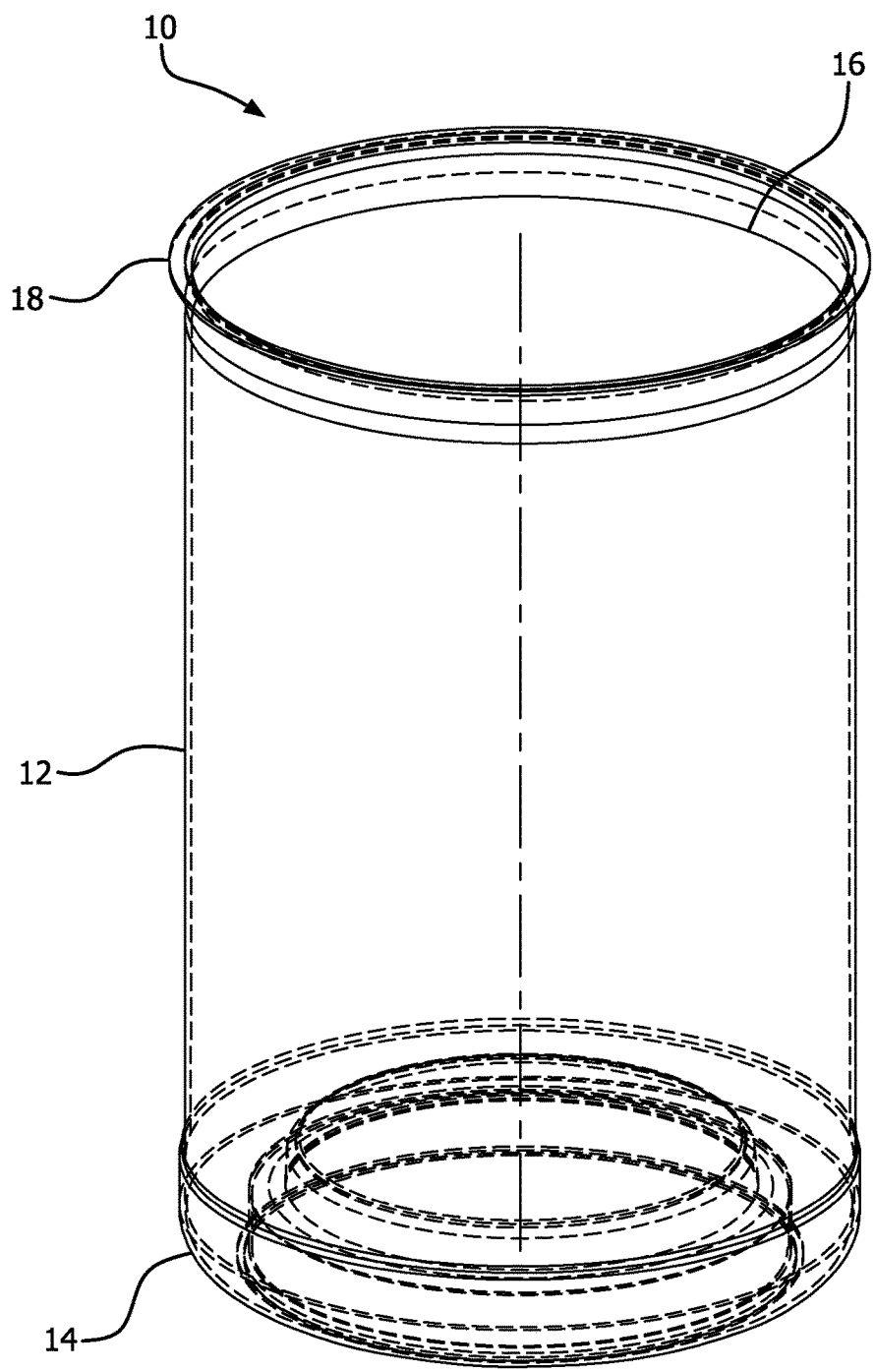
FIG. 1 is a perspective view of a can-type PET container according to the present invention.
Figure 2:
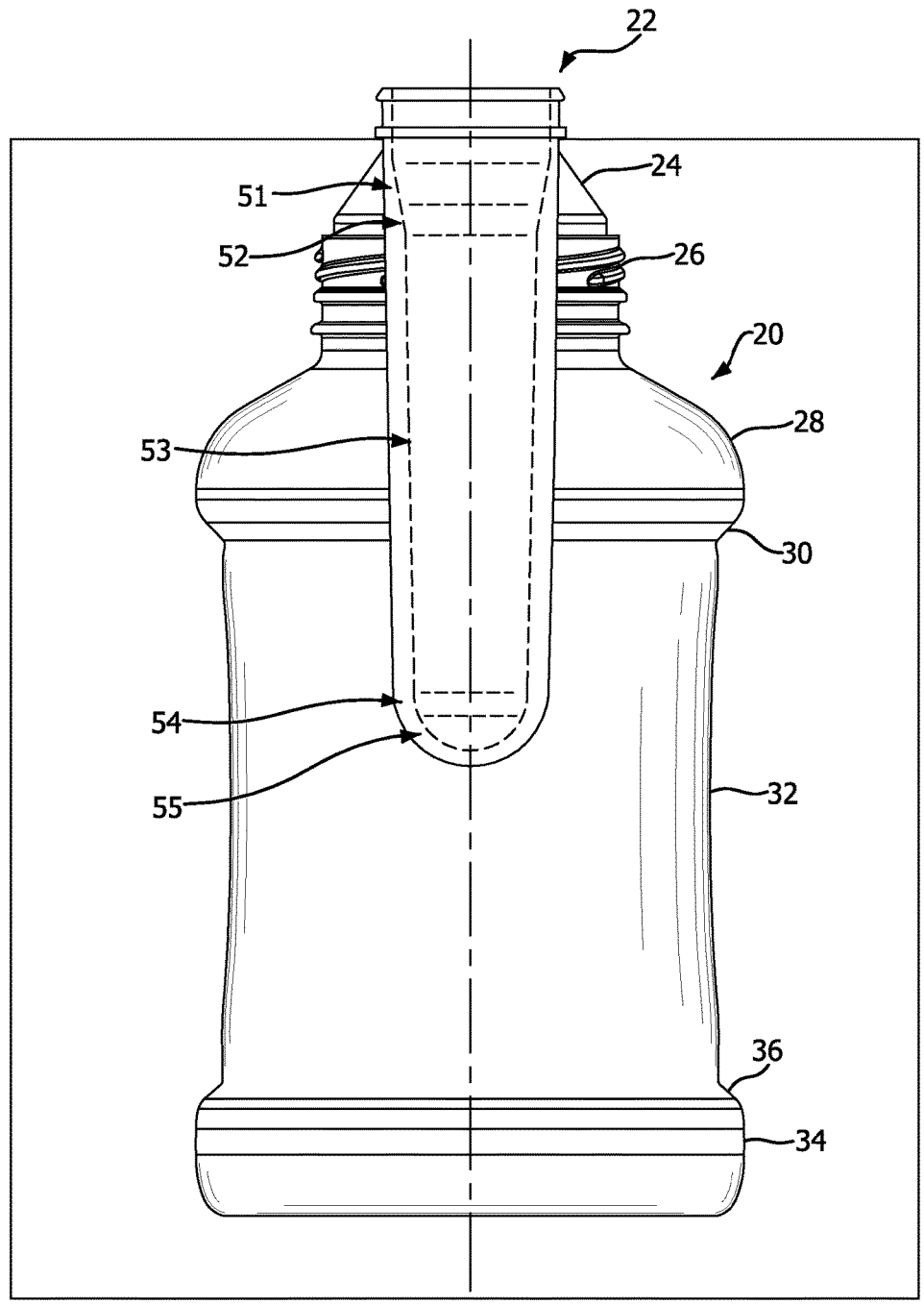
FIG. 2 is a side elevation view showing a preform overlaid onto a mold cavity for a jar-type container of the present invention.

The PET containers of the present invention can have any geometry, shape or size. For example, PET containers according to the present invention can be round, oval, polygonal, and irregular. Suitable containers can be a jar-type, can-type, carafe, wide mouth and any other type container known to those of ordinary skill in the art. Suitable features of the containers can include pressure absorbing features, grip enhancing features, shoulders, bumpers, finishes, chimes, standing rings, necks and others know to those of ordinary skill in the art. Examples of the shapes of containers according to the present invention are shown in FIGS. 1 and 2. FIG. 1 shows a preferred container of the present invention in the form of a plastic (i.e. PET) can 10, having a generally cylindrical side wall 12, a bottom 14, and an open top 16 circumscribed by a flange section 18. FIG. 2 shows a mold cavity 20 comprising walls and a preform 22 for another embodiment of the present invention. The container defined by the walls of the mold cavity 20 comprises a conical top section 24, a finish section 26, a shoulder section 28, a first bumper section 30, a sidewall or barrel section 32, a bottom section 34 and a second bumper section 36.

Process of the Invention

The process of the present invention provides a process for producing a PET container having thermal properties unexpectedly superior to prior art heat-set containers.

The present invention provides a process for forming a blow molded PET plastic container having enhanced thermal properties, the process comprising the steps of, on an integrated system: injecting a molten PET resin into an injection mold cavity to form a preform; removing the preform while the preform is at a temperature of from about 75° C. to about 130° C.; conveying the preform to at least one conditioning station at a rate such that the temperature of the surface of the preform does not decrease more than 5° C.; conditioning the preform by selectively heating at least one portion of the preform selected from the group consisting of: neck forming portion, barrel forming portion, base forming portion, and heel forming portion, to define a conditioned preform; conveying the conditioned preform to a blow mold station at a rate such that the temperature of the surface of the preform does not decrease more than 5° C.; inserting the conditioned preform into a blow mold having walls that define a blow cavity that defines a shape of a finished article, wherein the mold has at least three temperature zones along an axis of the mold all of which are above the glass transition temperature of PET; blowing the preform into a finished PET container by a stretch blow molding process comprising the steps of: i. inserting an elongated stretch blow rod into the conditioned preform to contact a bottom portion of the conditioned preform thereby providing a downward pressure to stretch the conditioned preform to a base portion of the mold; ii. simultaneously injecting low pressure air into the conditioned preform at a pressure of from about 100 psi to about 200 psi to form a pre-blown preform; and iii. immediately after ii, injecting high pressure air at a pressure of from about 400 psi to 600 psi into the pre-blown preform to expand the pre-blown preform against the mold walls to form the finished container; holding the finished container in the mold for a time period of from about 2 seconds to about 20 seconds; releasing the finished container from the mold wherein the temperature of the finished container is from about 80° C. to about 125° C.; and allowing the finished container to cool to ambient temperature.

In another embodiment, the present invention provides a process for forming a blow molded PET plastic container having enhanced thermal properties, the process comprising the steps of, on an integrated system: injecting a molten PET resin into an injection mold cavity to form a preform; removing the preform while the preform is at a temperature of from about 75° C. to about 130° C.; conveying the preform to at least one conditioning station at a rate such that the temperature of the surface of the preform does not decrease more than 5° C.; conditioning the preform by selectively heating at least one portion of the preform selected from the group consisting of: neck forming portion, barrel forming portion, base forming portion, and heel forming portion, to define a conditioned preform; conveying the conditioned preform to a first blow mold station at a rate such that the temperature of the surface of the preform does not decrease more than 5° C.; inserting the conditioned preform into a first blow mold having walls that define a blow cavity that defines a shape of a finished article and a first volume, wherein the first mold has at least three temperature zones along an axis of the first mold all of which are above the glass transition temperature of PET; blowing the preform into a finished PET container by a stretch blow molding process comprising the steps of: i) inserting an elongated stretch blow rod into the conditioned preform to contact a bottom portion of the conditioned preform thereby providing a downward pressure to stretch the conditioned preform to a base portion of the first mold; ii) simultaneously injecting low pressure air into the conditioned preform at a pressure of from about 100 psi to about 200 psi to form a pre-blown preform; and iii) immediately after ii, injecting high pressure air at a pressure of from about 400 psi to 600 psi into the pre-blown preform to expand the pre-blown preform against the walls of the first mold to form an intermediate container; iv) holding the intermediate container in the mold for a time period of from about 2 seconds to about 20 seconds; v) releasing the intermediate container from the mold wherein the temperature of the finished container is from about 80° C. to about 125° C.; vi) conveying the intermediate container to a second mold having walls that define a blow cavity that defines a shape of a finished article and a second volume, wherein the second mold has at least three temperature zones along an axis of the second mold all of which are above the glass transition temperature of PET, and wherein the second volume is the same as the first volume; vii) inserting an elongated stretch blow rod into the intermediate container to contact a bottom portion of the intermediate container thereby providing a downward pressure to stretch the intermediate container to a base portion of the first mold and injecting high pressure air at a pressure of from about 400 psi to 600 psi into the intermediate container to expand the intermediate container against the walls of the second mold to form the finished container; viii) directing a cooling fluid to an inner surface of the finished container; ix) releasing the finished container from the second mold, wherein the finished container is at a temperature of from about 80° C. to about 170° C.; and x) allowing the finished container to cool to ambient temperature.

The process of the present invention comprises the step of injecting a molten PET resin into a mold having a cavity to form a preform. Any injection-molding machine can be employed, which is equipped with an injection plunger or a screw, reciprocating extrusion unit or continuously operating extrusion unit, and the polymer is injected into the injection mold through, for example, a nozzle, valve, sprue or gate. Then, the PET flows into the cavity of the injection mold where it is solidified into the preform article for stretch blow molding according to the present invention.

In a preferred form of the invention, the containers are injection molded on an integrated platform where all molding and conditioning process steps described herein are conducted in line with no interruptions. As used herein, the term "integrated system" refers to a system where PET containers of the present invention are made by a machine having on the same platform an injection molding station for making preforms and at least one blow molding station for blowing the preform into a finished article. Thus, in such integrated system preforms are made by conventional injection molding and then, while still hot, are carried to a blowing station on the same platform in line. In an integrated system, the preform does not have to be reheated to a preferred orientation temperature from ambient temperature as is typically required for non-integrated platforms. Accordingly, the preform of an integrated system will typically have a single heat history unlike a preform that is formed, cooled and then reheated to the desired orientation temperature and, therefore, has multiple heat histories.

Preforms made and treated on an integrated platform typically have a minimum thermal gradient across the wall and preferably also have a thermal gradient along the preform body. These thermal gradients aid in achieving controlled preferential orientation of desired sections of the finished article that translates into improved thermal resistance properties of the finished container.

Embodiments of the present invention that employ an integrated platform also have the benefit that the performs, because they are not exposed to ambient conditions for any appreciable amount of time, have a low moisture content. This aids in preventing hydrolysis of the PET, which otherwise may seize the polymer chains and release phthalic acid. In a preferred embodiment, the preform maintains moisture content of less than 30 ppm from when it is injection molded to when it is blown into a container.

Shown in FIG. 2 is an exemplary embodiment of a preform according to the present invention wherein preform 22 comprises distinctive zones each of which corresponds to a distinct area of the finished article. In the embodiment shown in FIG. 2, the preform comprises six distinct zones. Zone 51 is a finish-forming region, zone 52 is a shoulder-forming region, zone 53 is a barrel-forming region, zone 54 is a heel-forming region, and zone 55 is a base-forming region. Preform 22 is amorphous in that the PET polymer chains typically do not form lamellae, globules, or any other known molecular organization and, therefore, do not have a substantial amount of crystalline regions, if any exist at all.

A preform according to the present invention is designed such that the thickness ratio of the preform to the finished container is an important feature. As used herein, the term "thickness ratio" is defined as the thickness in a zone of the preform responsible for forming a corresponding portion of the container to the thickness of the container in the zone correspondingly formed from the portion of the preform. Preferably, the thickness ratio is within the range between about 2.0 to about 7.5. In some embodiments, the thickness ratio is within the range between about 3.5 to about 7.0. In other embodiments, the thickness ratio is within the range between about 4.0 to about 6.0 Although the thickness ratio is dependent on the design geometry of the container and varies from one section of the container to another, it is also to a large extent, dependent on the intended application. For example, for hot-fill applications, the ratio is preferably between about 2.8 and about 6.4. For applications where both hot-fill and pasteurization operations will be employed, for example, the ratio is within the range between about 3.1 and about 4.7, more preferably between about 3.6 and about 4.9, and even more preferably between about 3.9 and about 5.2. In one preferred embodiment, for example, the shoulder and upper portion of a heat set container has a thickness ratio of between about 3.2 and about 3.8, more preferably between about 3.4 and about 4.2, and most preferably about 3.8 and about 4.6; the barrel portion of the container measured in the middle of the barrel preferably has a thickness ratio of between about 3.6 and about 4.3, more preferably between about 3.8 and about 4.5, and most preferably between about 4.0 and about 4.8; and the base portion preferably has a thickness ratio of between about 2.2 and about 2.5, more preferably between about 2.4 and about 2.8, and most preferably between about 2.7 and about 3.0.

The density ratio of the preform to the finished container is also an important feature of the present invention. As used herein, the term "density ratio" is defined as the density of the finished article to the density of the amorphous preform. In some embodiments of the present invention, the density ratio is preferred to be within the range of between about 1.025 and about 1.049. In other embodiments of the present invention, the density ratio is preferred to be in the range of between about 1.035 and about 1.049. In still other embodiments of the present invention, the density ratio is preferred to be greater than about 1.049. Typically, the greater the density ratio the more enhanced thermal resistance exhibited by the resulting container.

In accordance with the present invention, the average hoop and axial stretch ratios of the preforms typically vary from about 3.0 to about 4.0 for the hoop and from about 1.1 to about 1.5 for the axial. These values, however, are average values and zone-dependent based upon the size and geometry of the container as will be appreciated by those skilled in the art.

The process of the present invention also comprises the steps of removing the molded preform while the preform is still hot and has a thermal gradient through and along the wall of the preform and transporting the hot preform to at least one conditioning station, preferably within 10 seconds after completion of injection molding. Preferably, the temperature of the preform as it is removed from the injection molding station is about from 75° C. to about 130° C., more preferably from about 80° C. to about 110° C., still more preferably from about 90° C. to about 105° C., and most preferably about 100° C.

In preferred embodiments of the present invention where an integrated system is employed, the preform preferably exhibits a temperature gradient through its wall where the preform is generally hotter on the outside of the wall than on the inside wall and the thermal gradient through the wall is typically not exceeding 5° C.

In preferred embodiments of the present invention, the preform, while it is being transferred from the injection molding station to a blow molding station is "conditioned" by further modifying the temperature of select portions of the preform. Such temperature modification can occur at at least one conditioning station comprising a heating or cooling element. In preferred embodiments, the temperature of the performs are further modified by heating or cooling certain of the zones (i.e., portions) of the preform. For example, in one preferred embodiment of the present invention, at least one of the neck forming, barrel forming, heel forming, and base forming zones of the preform are further heated to achieve a temperature gradient in the specific areas of as much as about 20° C., more preferably as much as about 30° C., and most preferably as much as about 40° C. Without intending to be bound by any particular theory, it is believed that such selective conditioning promotes preferential orientation of the polymer during the blow molding process. Heat for the conditioning step may be applied by any means known to those skilled in the art such as, for example, hot air generated by a heat gun, infrared heaters, or combinations thereof. The preferred method for the conditioning step is employing a heat gun or a series of heat guns. In other embodiments, the conditioning step employs an infrared hater or a series of infrared heaters.

The process of the present invention optionally comprises the step of transporting the preform to a second conditioning station, preferably within about 10 seconds after the first conditioning step has been completed. When employed, the second conditioning step preferably heats and/or cools at least one of the neck forming, barrel forming and heel forming zones of the preform to ensure that the temperature gradient through the preform walls is as described above with respect to the first conditioning step.

Regardless of whether one, two, or more conditioning steps are employed as described above, the process of the present invention further comprises the step of conveying the conditioned preform to a blow mold station, preferably within about 10 seconds after the final conditioning is completed, to expand the preform into a container by way of the blow molding process of the present invention. The blow molding process of the present invention comprises the step of inserting a preform into a blow mold, locking the blow mold halves, and blowing air into the preform to biaxially stretch the PET into the container shape defined by the mold. Two embodiments of this process will now be described. The first embodiment is a single blow station process and the second embodiment is a dual blow station process wherein each blow station comprises a blow mold.

Single Blow Mold Embodiment

In single blow mold embodiments of the present invention, the single-heat history preform 22 (FIG. 2) is disposed within a blow mold cavity 20 of a single blow station wherein the temperature of the mold is higher than the glass transition temperature ("Tg") of PET. Preferably, the temperature of the mold is between from about 73° C. to about 250° C., more preferably between from about 150° C. to about 240° C., still more preferably between from about 160° C. to about 230° C., and most preferably between from about 160° C. to about 200° C. The wall of the blow mold defines a blow cavity having a volume for receiving a PET preform from the injection molding station and blowing the preform into an expanded PET article against the blow cavity wall.

Figure 3:
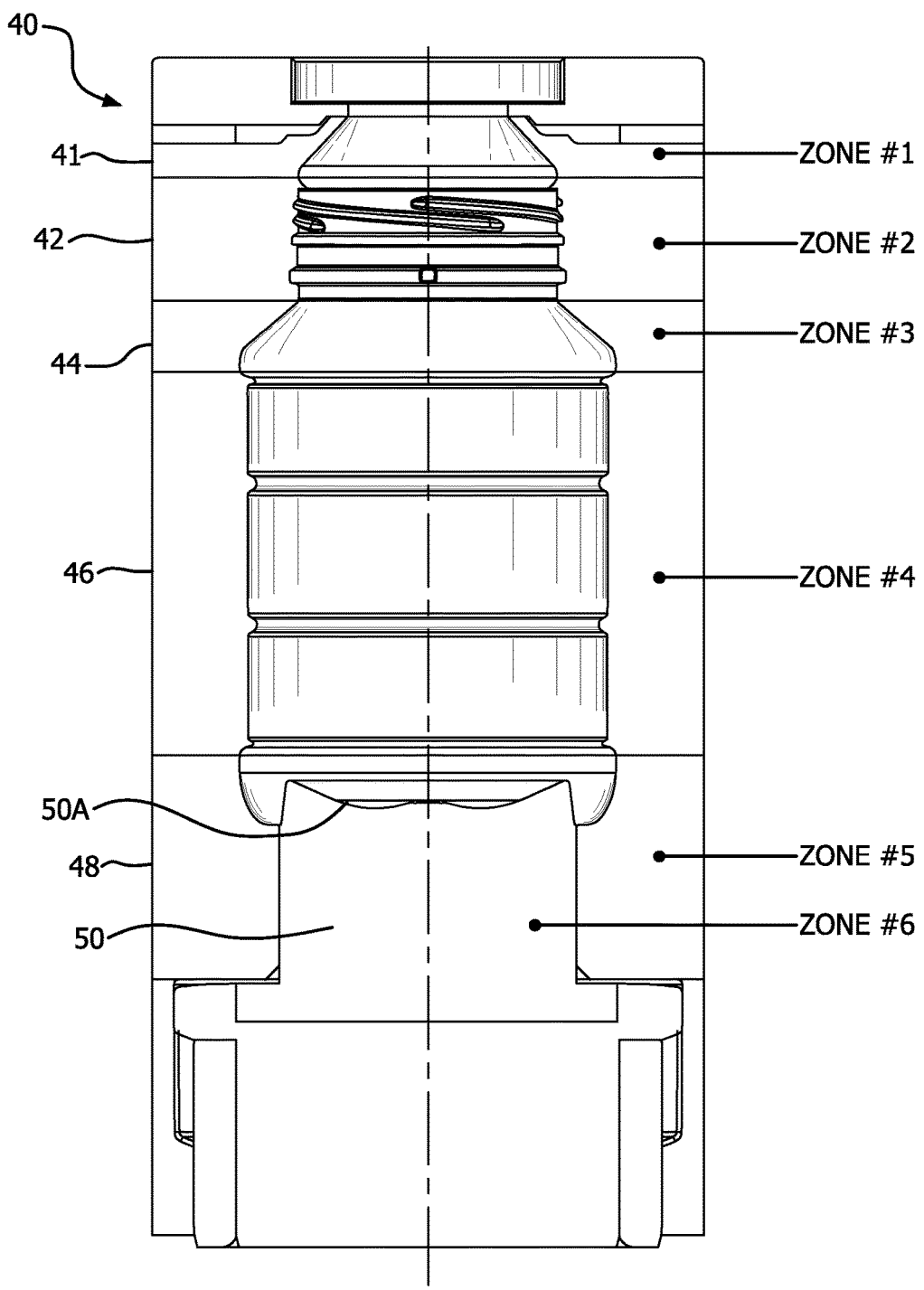
FIG. 3 is a side elevation view of a mold cavity having six zones of temperature control.

In a preferred embodiment shown in FIG. 3, the mold has more than two zones of thermal control along an axial dimension of the mold where the temperature of each zone can be independently set and controlled within the ranges set forth above. FIG. 3 shows one example of a multi-zone blow mold cavity having six zones that will maintain temperatures in the thinner wall sections at higher temperatures than in the thicker wall sections. For example zone 1 for forming the conical top 61 will typically be maintained within the range of about 73° C. to about 120° C., zone 2 corresponding to the finish 62 will typically be maintained within the range of about 160° C. to about 240° C., zones 3 and 5 corresponding respectively to the shoulder 64 and the heal 48 will typically be maintained within the range of to about 150° C. to about 230° C., zone 4 corresponding to the barrel section 46 will typically be maintained within the range of about 190° C. to about 250° C. and zone 6 corresponding to the bottom 50 will typically be maintained within the range of about 100° C. to about 230° C. Although the mold cavity of FIG. 3 shows six zones of temperature control, the present invention contemplates providing fewer or greater number of zones including from three to eight or more separate zones of temperature control.

The mold shown in FIG. 2 has a stationary (i.e., fixed) bottom portion. In certain embodiments of the present invention such as that shown in FIG. 3, for example, the mold has a bottom portion 50 that is mounted for reciprocating translational movement along an axis of the cavity from a first position outward of the cavity to a second position axially inward. It should be understood that although bottom portion 50 does not have to be mounted for movement and can be fixed in place in the molding position. The bottom portion 50 can be of a unitary structure or it can have more than one part such as, for example, a pin and sleeve assembly. Still referring to FIG. 3, bottom portion 50 includes a molding surface 50A for forming a bottom portion of the container and, optionally, a pressure absorbing panel in any form such as those disclosed in commonly assigned co-pending U.S. patent application Ser. No. 12/709,302 (U.S. Publication No. 2011/0204067), which is incorporated herein by reference in its entirety.

Once in the mold, a stretch blow molding process is employed to form the container of the present invention. In preferred embodiments, the stretch blow molding process of the present invention comprises a pre-blow step immediately followed by a blowing step.

During the pre-blow process, an elongated rod is inserted into the mold cavity of the heated preform and blows a "puff" of pressurized air into the preform at a relatively lower pressure of from about 100 psi to about 200 psi and, preferably about 150 psi. In this pre-blow process, the air is preferably added simultaneously as the rod provides a downward pressure thereby stretching the preform to a base portion of the mold and outward under the low air pressure. Immediately after the pre-blow process, high pressure air at from about 400 psi to about 600 psi is injected into the container through the rod to press an outer surface of the preform into contact with an inner surface of the mold cavity to form the container.

In embodiments where a single blow mold station is employed, the container will preferably remain in the mold for a time of from about 2 seconds to about 20 seconds, more preferably from about 2 seconds to about 15 seconds, more preferably from about 2 seconds to about 12 seconds, more preferably from about 4 seconds to about 12 seconds, and most preferably from about 6 seconds to about 12 seconds.

Preferably, in the single blow mold embodiment, the temperature of the PET container is from about 80° C. to about 170° C., and more preferably from about 100° C. to about 170° C. when it is released from the mold. In this temperature range the container will be hot enough to continue thermal annealing yet rigid enough to stand on its own.

Dual Blow Mold Embodiment

In another embodiment of the present invention, PET containers having improved thermal properties are made by a dual-blow process that employs two blow stations in series, with each blow station having mold walls defining a cavity. In describing this embodiment, the molds will be referred to as the first blow mold and the second blow mold. Thus, in this embodiment, the present invention provides an integrated system for blow molding a PET container comprising, in line: an injection molding station for forming PET preforms, wherein each of the PET preforms is defined by a sidewall defining a cavity, an end wall, and an open end; a first blow molding station comprising a first mold defining a first blow cavity of a first volume for receiving a PET preform from the injection molding station and blowing the preform into an expanded PET article against the first blow cavity, wherein the temperature of the first mold is higher than the glass-transition temperature of PET; a second blow molding station comprising a second mold defining a second blow cavity having a second volume substantially the same as the first volume for receiving the expanded PET article and blowing the expanded PET article against the second blow cavity to form a PET article, followed by cooling the PET article; and a conveyor for moving the PET preforms to the first blow molding station and the expanded PET articles to the second blow molding station, wherein at least one of the first and second molds has at least three zones of thermal control.

In this embodiment, the first blow mold can be, and preferably is, the same blow mold as the single blow mold embodiment detailed above (either with or without the translational bottom portion 50 shown in FIG. 3). The first blow mold defines a first blow cavity having a first volume for receiving a PET preform from the injection molding station and blowing the preform into an expanded PET article against the first blow cavity. In preferred embodiments of the present invention, the operation of the first blow mold (e.g., temperature profile, heat zones, time in mold, etc.) is as described above. However, in this embodiment, after the conditioned preform is blown in the first mold of the dual-mold embodiment of the present invention to form an intermediate container, the intermediate container is then immediately conveyed to a second blow mold station where the intermediate container is further blown into a finished container. Significantly, in the process of the present invention, each of the first and second blow molds have a blow cavity of roughly the same size and dimension (i.e., cavity volume). Preferably, the second blow mold cavity is the same volume as the first blow mold cavity.

Once in the second mold, the intermediate container will experience heated zones in second mold, which may be, and preferably are, the same temperature zones (i.e., settings) as those described above for the first blow mold. The intermediate container is then stretched with another elongated rod and subjected to high pressure air at from 400 psi to 600 psi to be blown into contact with the inner wall surface of the cavity to form the product container.

The product container will preferably remain in the second mold for a time of from about 2 seconds to about 20 seconds, more preferably from about 2 seconds to about 15 seconds, more preferably from about 2 seconds to about 12 seconds, more preferably from about 4 seconds to about 12 seconds, and most preferably from about 6 seconds to about 12 seconds.

Figure 4:
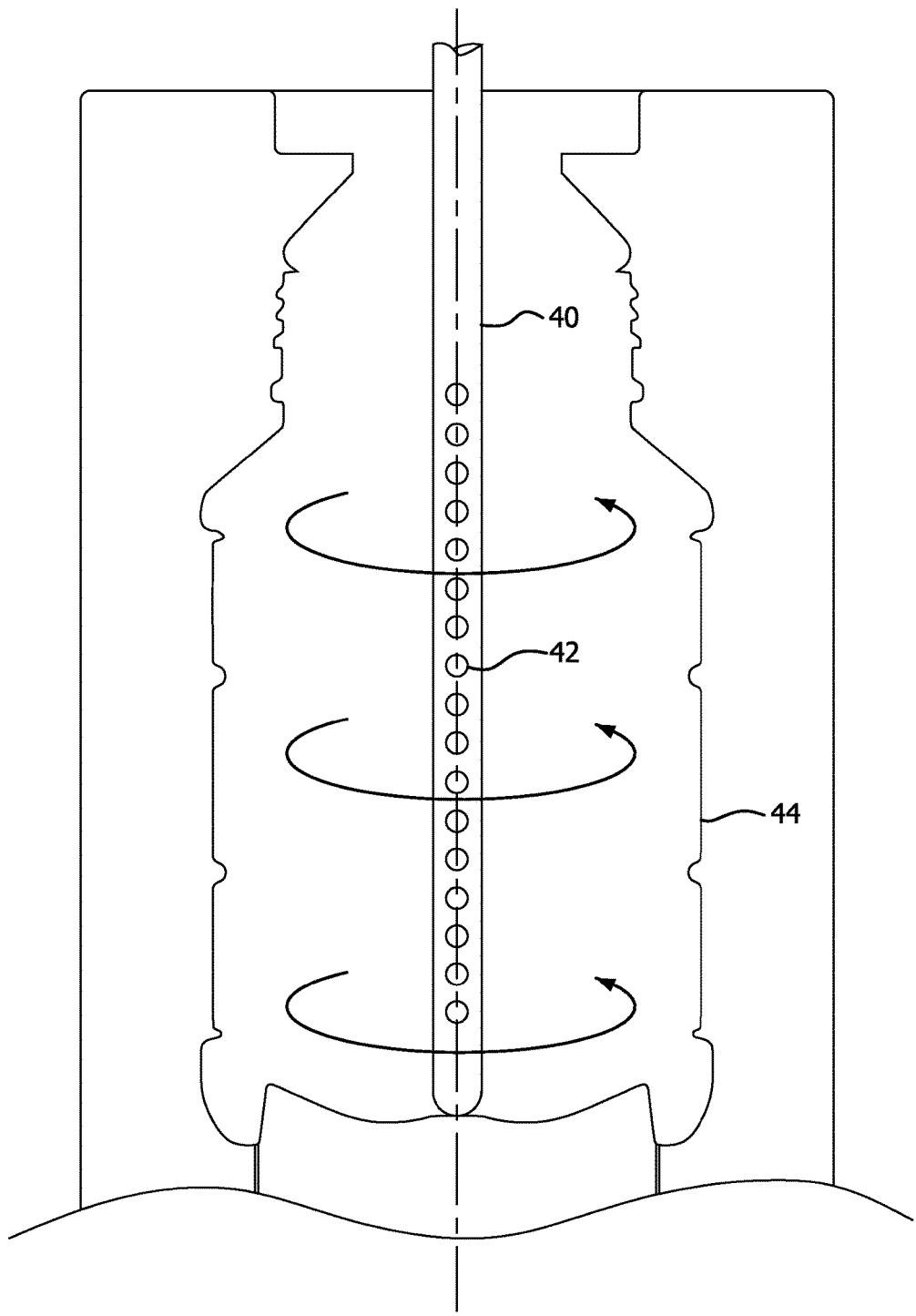
FIG. 4 is a side elevation view in cross section of a blow mold station having a blow rod providing recirculating air to an inner surface of the container being formed.

In preferred embodiments of the present invention, the product container is cooled prior to its ejection from the second mold. To cool the product container, cooling fluid may be directed an inner surface of the sidewall of the second mold and/or directly in the product container. The cooling fluid can be a liquid or a gas but more preferably is a gas. Suitable gasses include air, nitrogen and other suitable gasses known to those of skill in the art. In especially preferred embodiments, the present invention allows for selectively cooling predetermined portions of the inner surface of a freshly blown (i.e., heated) container by directing a flow of cooling fluid with the thicker wall portions receiving more cooling fluid than the thinner wall portions as the container has a sidewall having varying thicknesses along an axial dimension of the container with thinner wall portions and thicker wall portions. For example, referring now to FIG. 4, a preferred form of the invention is shown where the cooling fluid is air and is directed to the inner surface of the product container using a blow rod 40 having air holes 42. The air is preferably at a temperature of less than about 50° C. and more preferably within the range of 20° C. to about 50° C. and under a pressure from 290 psi to about 580 psi for a time from about two seconds to about six seconds. Holes 42 will have varying area dimensions to provide greater amounts of cooling air to the thicker wall portions and less cooling air to the thinner wall portions.

In preferred embodiments, the product container is removed from the second mold at a temperature of preferably from about 80° C. to about 170° C., and more preferably from about 100° C. to about 170° C. where it is rigid and self-supporting, but having enough heat energy to continue the annealing process outside the mold. The resulting container will possess an enhanced thermal properties required for the hot-fill, pasteurizable and retortable applications and able to withstand temperatures of the contents up to about 250° F. and packaging processing temperatures up to about 270° F.

Highlights of the process of the present invention include: one step process with a preform gradient temperature between 105° C. and 115° C.; containers that have a hoop stretch ratio of less than about 3.5 and an axial stretch ratio of less than about 1.7; and the process allows for continuing thermal relaxation by ambient cooling upon exiting the hot blow mold, i.e., no frozen-in stresses resulting in a higher onset of shrinkage.

The Container of the Present Invention

The present invention provides a blow-molded PET container comprising a wall having a density of between about 1.370 g/cc and 1.385 g/cc, a heat-induced crystallinity of from about 18% to about 25%, and a strain-induced crystallinity of from about 55% to about 75%, wherein the PET container, when filled with a liquid having a temperature of from about 100° C. to about 132° C., will not experience a change in volume of greater than 3%. As illustrated in Table 1, prior art PET containers produced by a conventional cold mold process can be characterized by a substantial amount of mobile amorphous phase and small amount of heat induced crystallinity. In comparison, prior art heat set containers typically exhibit a greater percentage of heat induced crystallinity, i.e., up to about 35%, and still about the same amount of rigid amorphous fracture as in the cold mold containers. Containers produced by the process of the present invention, however, typically having about the same small amount of heat induced crystallinity and mobile amorphous phase but exhibit a high percentage of the rigid amorphous phase, i.e., about 60% or greater. By having a greater percentage of the rigid amorphous phase characterized by the presence of tightly packed macromolecules and therefore having lesser amount of the free space and greater enthalpy position required to disintegrate macromolecules formation.

TABLE 1

Typical Average and Ranges of the PET Polymer Morphosis of Prior Art PET Containers Versus PET Containers Produced by the Processes of the Present Invention

| Average Typical Range | Heat Induced Crystallinity, % | Rigid Amorphous Fracture, % | Mobil Amorphous Fracture, % |
|---|---|---|---|
| Prior Art Cold Mold Process | 23 / 10-25 | 33 / 33-45 | 43 / 23-45 |
| Prior Art Heat Set Process | 35 / 30-35 | 32 / 30-35 | 33 / 30-35 |
| Process of Invention | 20 / 16-24 | 60 / 55-70 | 20 / 19-22 |

A preferred container of the present invention will have the following physical properties. The container can be filled with a liquid from about 100° C. to about 132° C. without experiencing a change in volume of greater than about 3%, more preferably less than about 2% and most preferably less than about 1%. The container will be optically clear before and after exposure to liquids of such temperatures.

PET containers of the present invention preferably have a density of between about 1.370 g/cc and about 1.375 g/cc, more preferably greater than about 1.375 g/cc, and most preferably greater than about 1.385 g/cc.

Container samples were made in accordance with the single mold embodiment of the present invention and process parameters summarized in Table 2.

TABLE 2

Process Parameters

| Sample | Description | Blow Time Range (sec) | Air Quench Time Range (sec) | Mold Temp. Range (° C.) | Combined Axial and Radial Blow Ratio |
|---|---|---|---|---|---|
| 1-A&B | Prior art 24 oz heat set container made by two-step process | 1.5-2.5 | 0.1-0.8 | 90-160 | >7 |
| 3-A | 24 oz Container of present invention | 4.0-6.0 | 2.5-3.0 | 90-210 | 5.57 |
| 3-B | 24 oz Container of present invention | 6.0-8.0 | 2.5-3.0 | 90-210 | 5.57 |
| 3-C | 45 oz Container of present invention | 10.0-18.0 | 1.0-4.0 | 90-210 | 5.57 |

Samples 3A and 3B are 24-ounce jar-type containers and Sample 3-C is a 45 ounce jar-type container prepared from PARASTAR 9000 PET resin sold by Eastman Chemical Company using a CIB-LAB laboratory machine with an integrated platform. The barrel section of these samples constitute about 80% of the surface area of the containers. The samples were blown from a preform at a starting temperature of from about 103° C. to about 115° C. and having a single heat history. The temperatures of the molds for Samples 3A, 3B, 3C were 180° C., 190° C. and 200° C., respectively, measured at the barrel section, for periods respectively of six seconds, eight seconds and twelve seconds. Prior art container PET samples 1A and 1B were 24 ounce jar-type container in an unfilled, clean state and were representative of containers well known to those of skill in the art.

Figure 5:
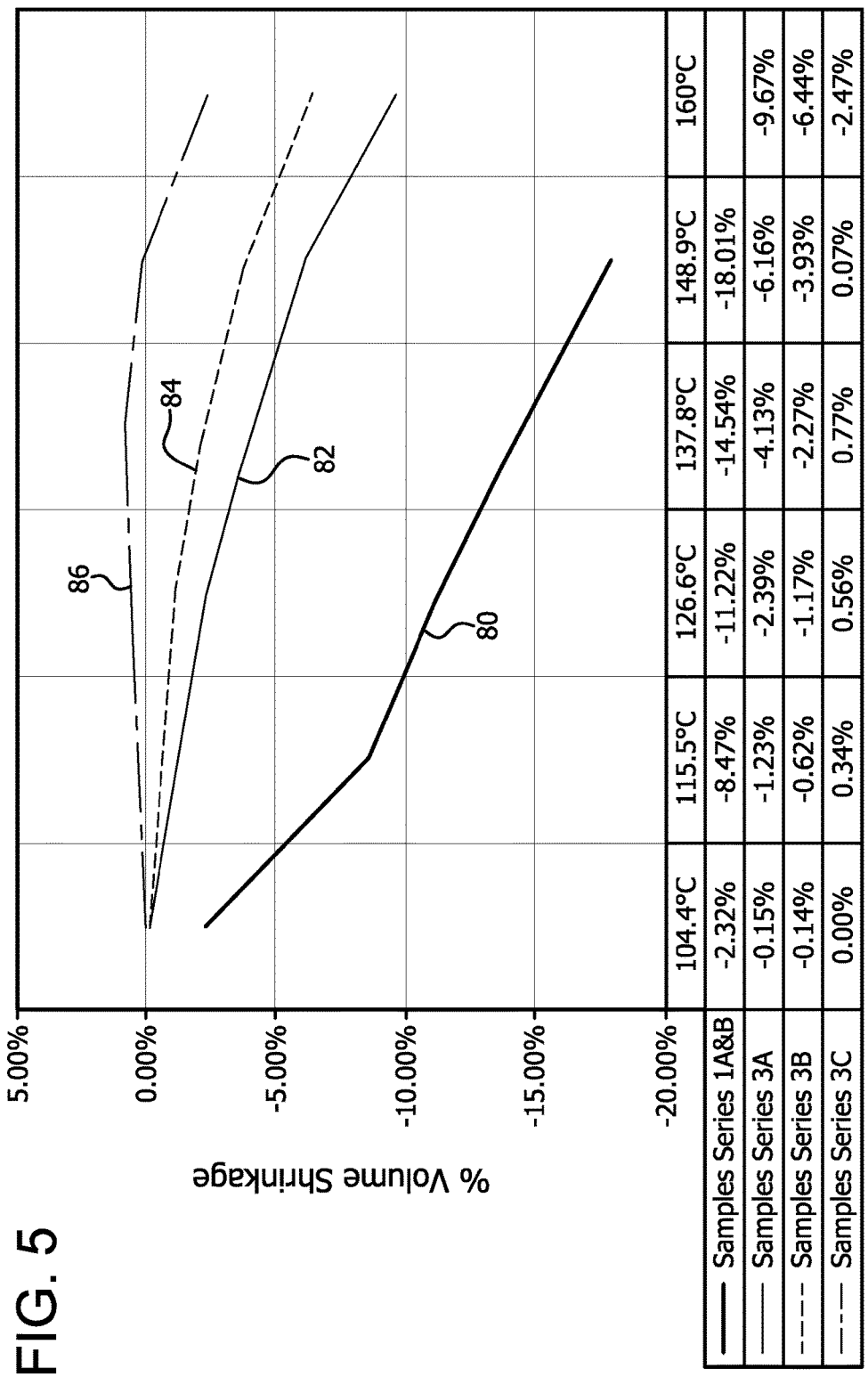
FIG. 5 is a graph of volumetric change versus hot fill temperature for containers having varying crystallinity.

PET containers of the present invention exhibit superior thermal properties as measured by the lack of shrinkage when filled with a high temperature liquid. This is illustrated by FIG. 5, which shows a plot of volume change (percent) versus hot fill temperatures for sample containers 3A-3C of the present invention and those of the prior art. The containers were first measured for volume by filling to overflow. The containers were then filled with hot vegetable oil, allowed to sit for five minutes, emptied and measured for volume, and the volume measurement process repeated for six discrete temperatures. The temperatures of the oil in the hot fill process were 104.4° C., 115.5° C., 126.6° C., 137.8° C., 148.9° C. and 160° C. The containers were filled allowing for 12.5 mm of headspace. The results of the hot fill tests are shown in FIG. 5 with prior art container samples 1A and 1B referred to by reference numeral 80 and container samples of the present invention 3A-3C respectively referred to with numerals 82, 84, 86.

Figure 6:
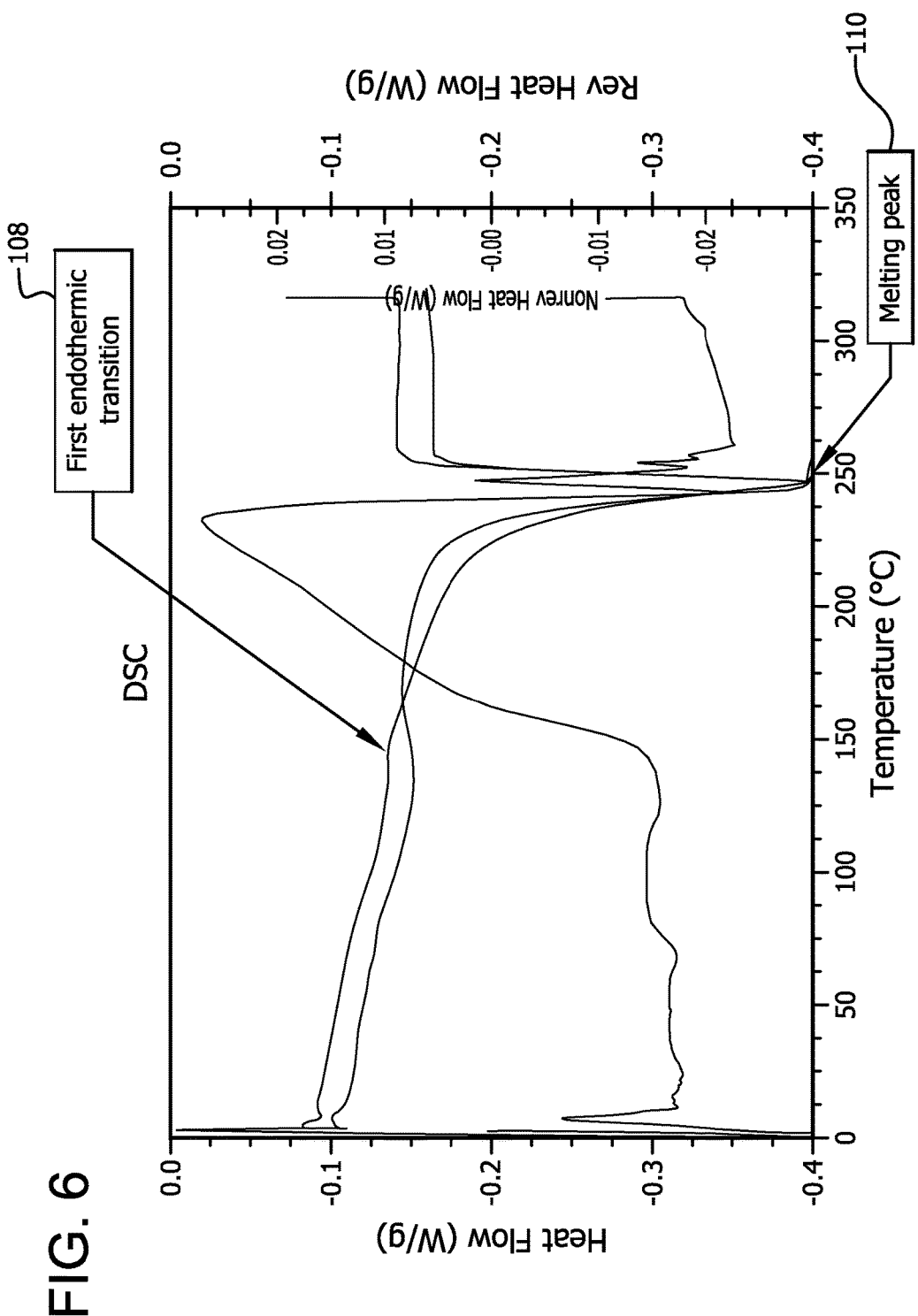
FIGS. 6-10 respectively show a plot of the results of a temperature modulated differential scanning calorimetry data PET containers Sample 3-A, Sample 3-B, Sample 3-C, Sample 1-A and Sample 1-B)
Figure 7:
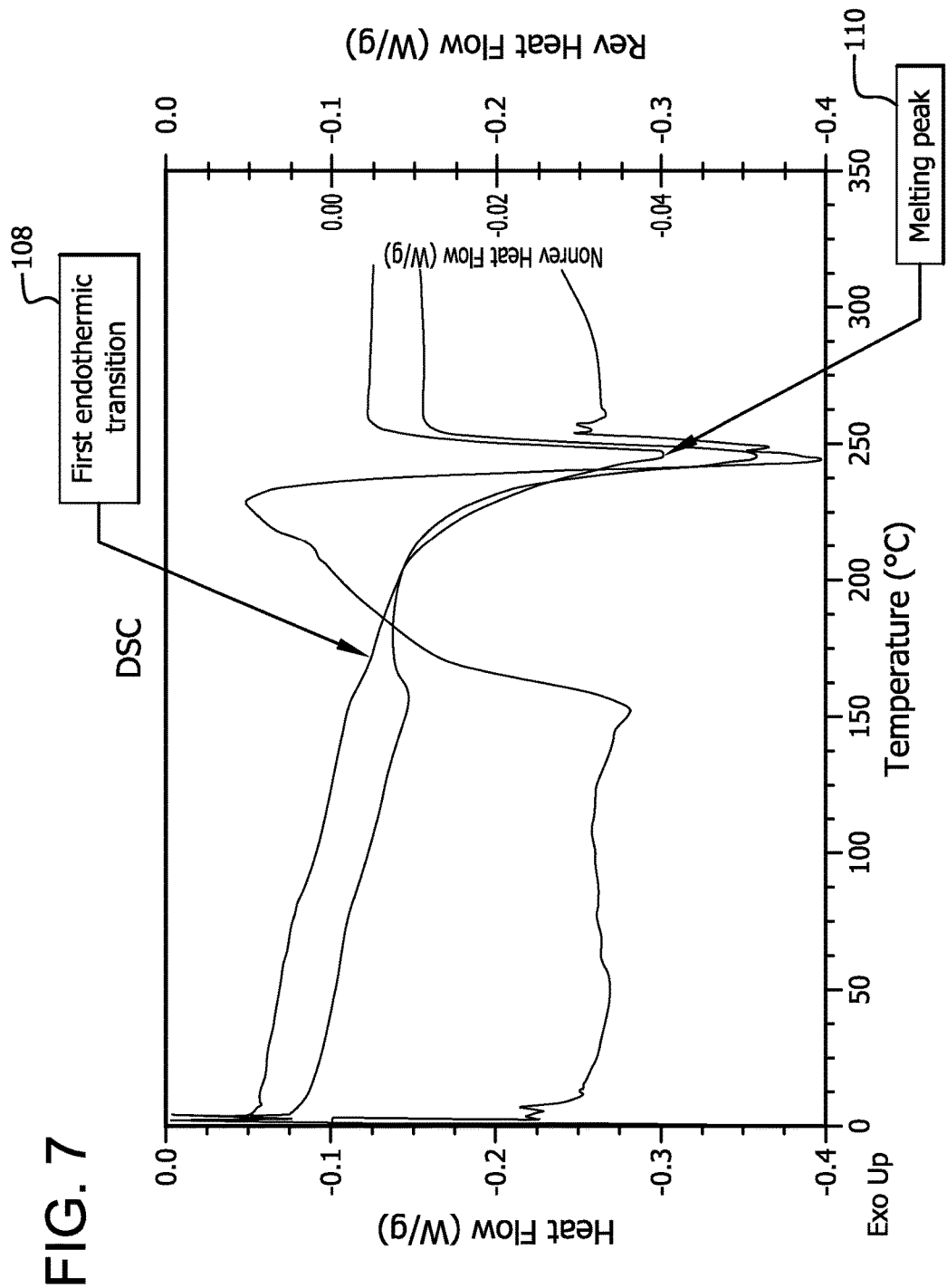
Figure 8:
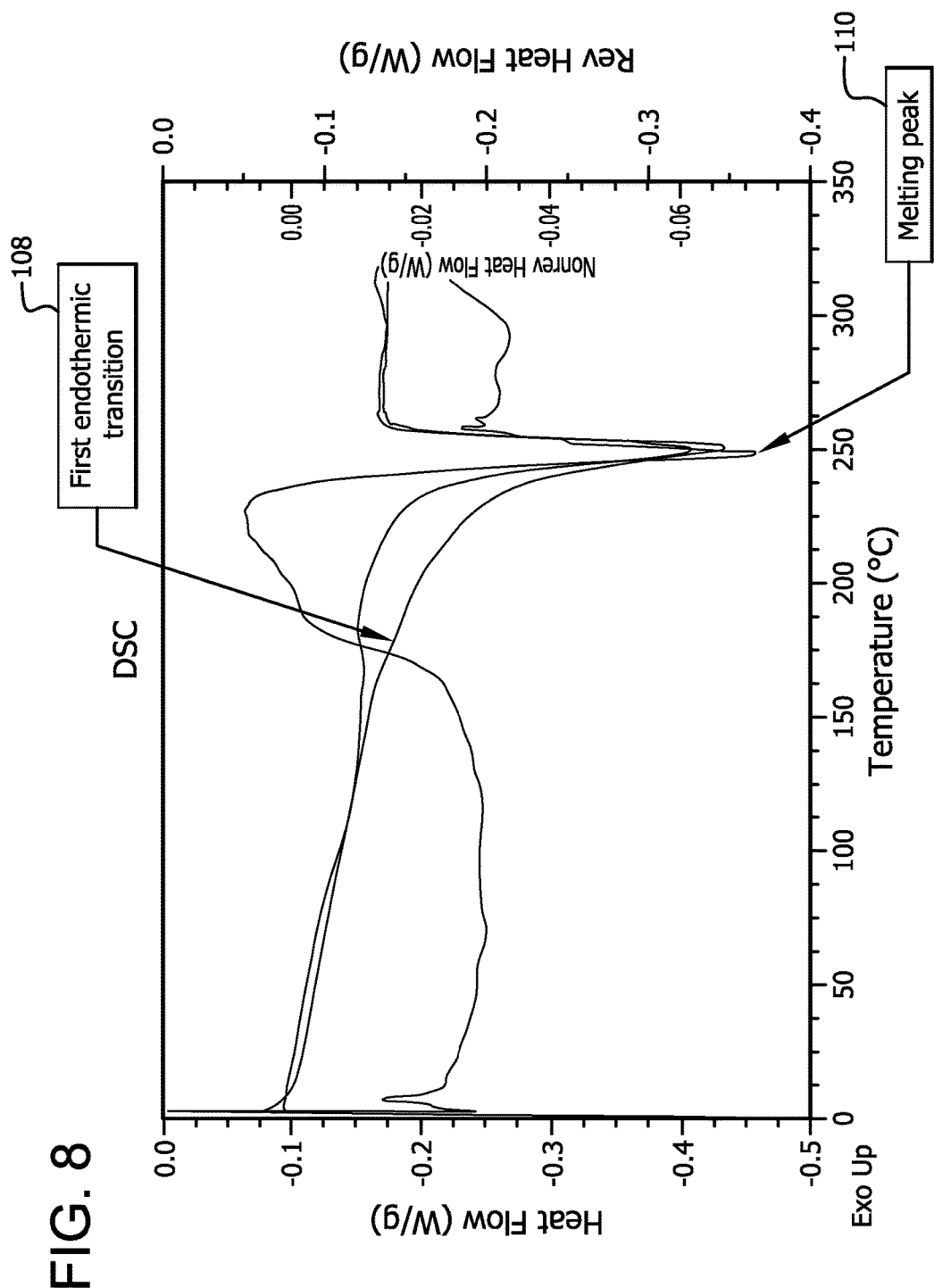
Figure 9:
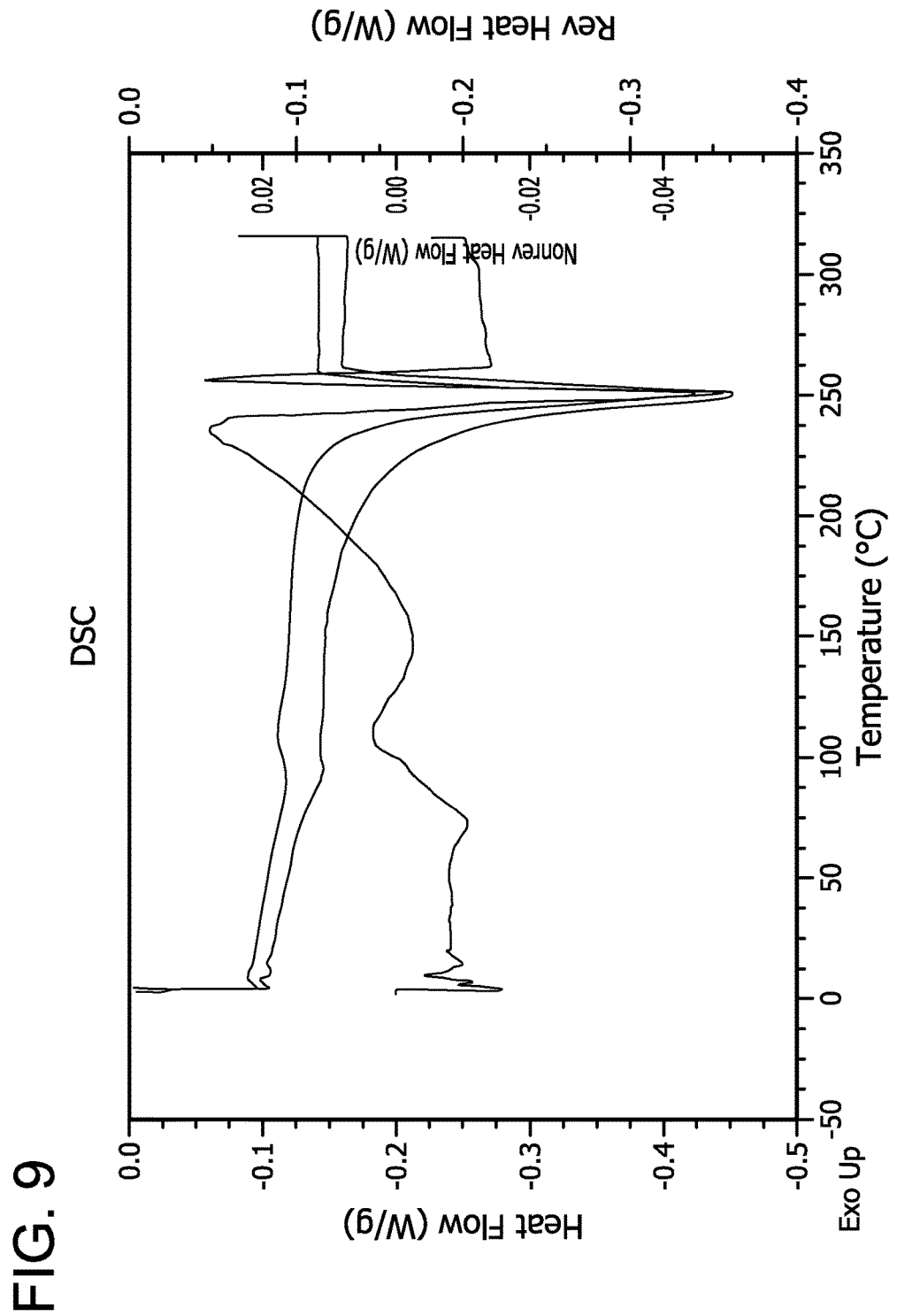
Figure 10:
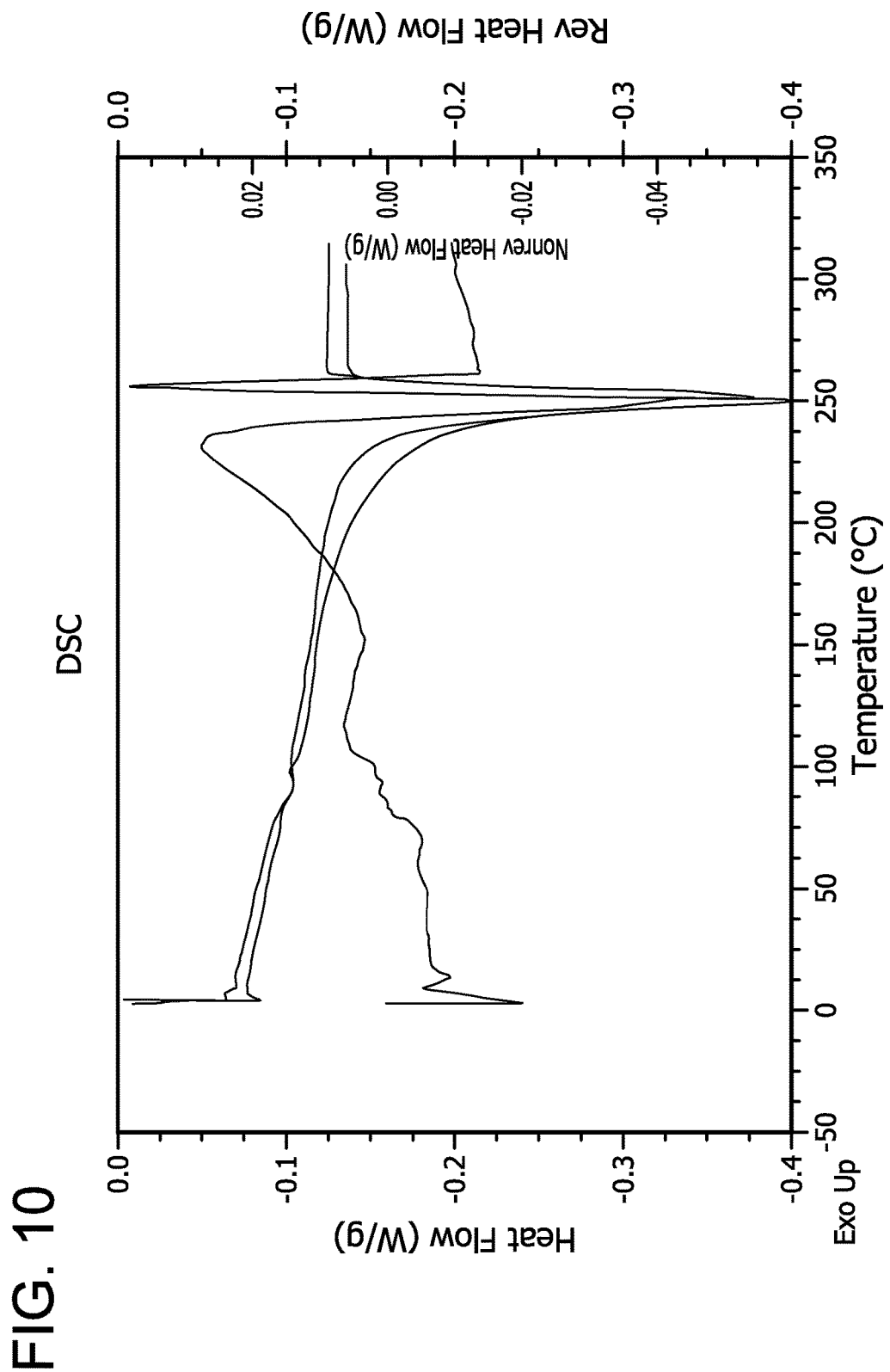

PET containers of the present invention also exhibit differences in polymer morphology as evidence by the measured transitions and crystallinity. Samples of PET containers of the present invention (Samples 3-A, 3-B, 3-C) and of samples of prior art PET containers 1-A, 1-B) were subjected to temperature modulated differential scanning calorimetry (TMDSC) and analyzed in the temperature range of 0° C. to 325° C. at a heating rate of 5° C./min. The samples were maintained in an inert nitrogen atmosphere with a flow rate of 50 ml/min. The results of the TMDSC data are shown in the following figures (FIG. 6, Sample 3-A, FIG. 7, Sample 3-B, FIG. 8, Sample 3-C, FIG. 9, Sample 1-A and FIG. 10, Sample 1-B). The information is summarized below in Tables 3 and 4.

TABLE 3

Glass Transition Temperatures of the PET bottle samples.

| SAMPLE DESCRIPTION | SPECIMEN # | GLASS TRANSITION TEMPERATURE, ° C. | |
|---|---|---|---|
| | | $1^{st}$ | $2^{nd}$ |
| Sample #1-A (24 oz) | 1 | 83.8 | |
| | 2 | 93.3 | |
| | Average | 88.6 | |
| Sample #1-B (24 oz) | 1 | 86.0 | |
| | 2 | 95.5 | |
| | Average | 90.8 | |
| Sample #3-A (24 oz) | 1 | 91.6 | 149.0 |
| | 2 | 101.5 | 133.9 |
| | Average | 96.6 | 141.5 |
| Sample #3-B (24 oz) | 1 | 89.0 | 160.9 |
| | 2 | 90.1 | 163.7 |
| | Average | 89.6 | 162.3 |

TABLE 3-continued

Glass Transition Temperatures of the PET bottle samples.

| SAMPLE DESCRIPTION | SPECIMEN # | GLASS TRANSITION TEMPERATURE, ° C. | |
|---|---|---|---|
| | | $1^{st}$ | $2^{nd}$ |
| Sample #3-C (45 oz) | 1 | 90.6 | 171.3 |
| | 2 | 104.6 | 165.9 |
| | Average | 97.6 | 168.6 |

TABLE 4

Melting and Crystallization Data of the PET Bottle Samples

| Sample Description | Spec # | Tm Onset (° C.) | Tm Offset (° C.) | Tm Peak (° C.) | Hm 140° C. to 275° C. (J/g) | Hc 140° C. to 275° C. (J/g) | Hm − Hc (J/g) | % Crystallinity |
|---|---|---|---|---|---|---|---|---|
| Sample #1-A (24 oz) | 1 | 237.7 | 258.7 | 249.3 | 58.0 | 19.7 | 38.3 | 27.4 |
| | 2 | 238.5 | 255.9 | 249.9 | 82.2 | 36.8 | 45.4 | 32.4 |
| | Average | 238.1 | 257.3 | 249.6 | 70.1 | 28.3 | 41.9 | 29.9 |
| Sample #1-B (24 oz) | 1 | 235.7 | 259.3 | 253.1 | 61.0 | 18.0 | 43 | 30.7 |
| | 2 | 234.6 | 258.3 | 252.1 | 62.3 | 20.3 | 42 | 30.0 |
| | Average | 235.2 | 258.8 | 252.6 | 61.7 | 19.2 | 42.5 | 30.4 |
| Sample #3-A (24 oz) | 1 | 232.5 | 253.3 | 246.9 | 67.6 | 34.4 | 33.2 | 23.7 |
| | 2 | 231.4 | 255.2 | 245.3 | 74.1 | 38.0 | 36.1 | 25.8 |
| | Average | 232.0 | 255.3 | 246.1 | 70.9 | 36.2 | 34.7 | 24.8 |
| Sample #3-B (24 oz) | 1 | 228.4 | 253.4 | 246.7 | 84.3 | 42.6 | 41.7 | 29.8 |
| | 2 | 224.1 | 253.5 | 246 | 62.0 | 26.5 | 35.5 | 25.4 |
| | Average | 226.3 | 253.5 | 246.4 | 73.2 | 34.55 | 38.6 | 27.6 |
| Sample #3-C (45 oz) | 1 | 233.3 | 258.1 | 251.6 | 65.7 | 237.7 | 42 | 30.0 |
| | 2 | 234.7 | 258.1 | 250.6 | 87.7 | 37.1 | 50.6 | 36.0 |
| | Average | 234.0 | 258.1 | 251.1 | 76.7 | 30.4 | 46.3 | 33.0 |

The data in Table 3 show that the PET containers of the present invention have a first endothermic transition temperature 108 (FIGS. 6-8) and a second endothermic transition temperature 110 substantially higher than the first endothermic transition temperature. In a preferred form of the invention, the second endothermic transition will be at least about 20° C. higher than the first endothermic glass transition temperature, more preferably at least about 30° C. higher, even more preferably at least about 40° C. higher and most preferably at least about 50° C. higher. In another preferred form of the invention the second endothermic transition will be at a temperature from about 120° C. to about 180° C., even more preferably from about 130° C. to about 170° C. and most preferably from about 135° C. to about 165° C.

Figure 11:
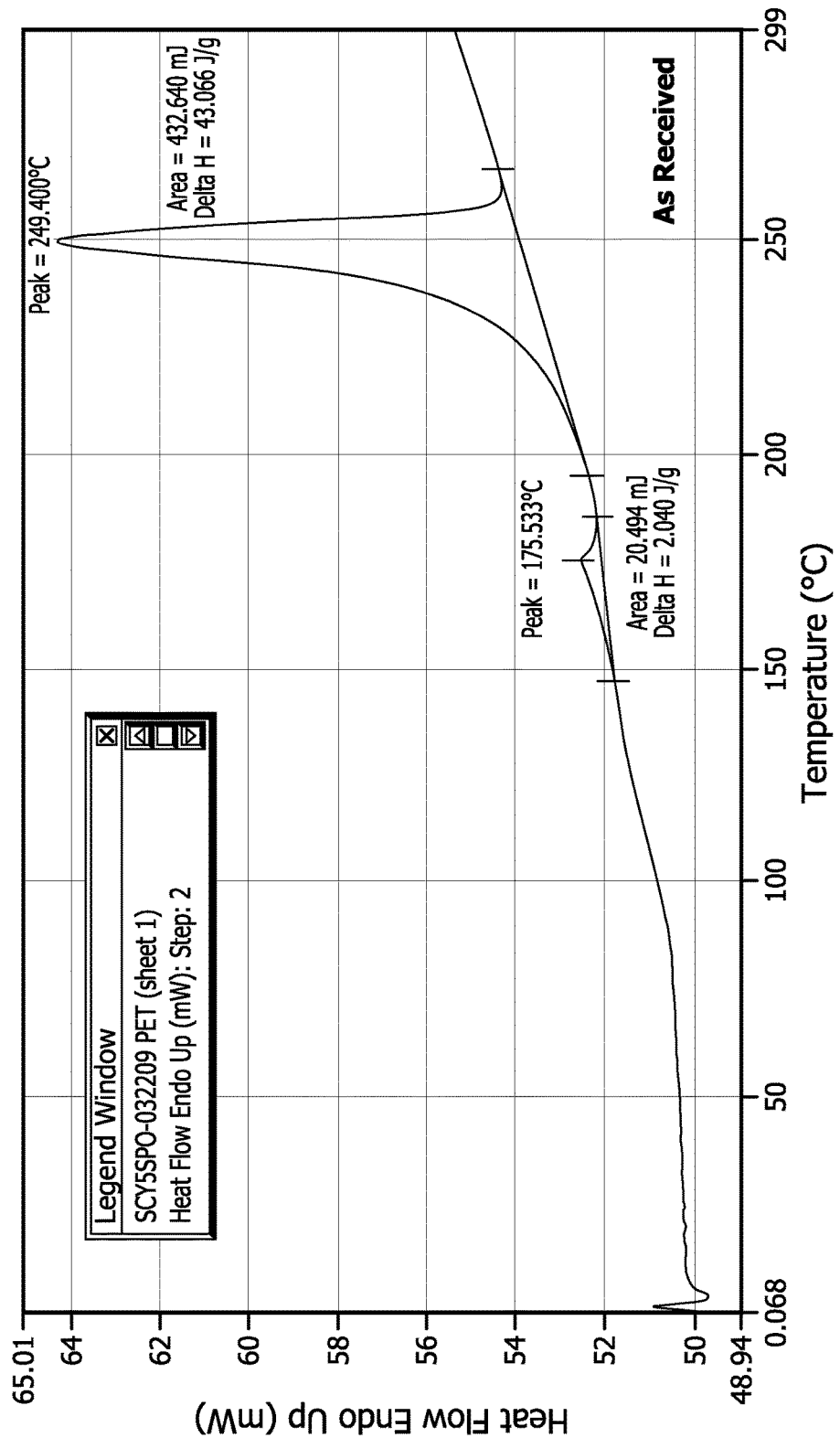
FIG. 11 shows a typical DSC thermogram of PET material forming the shoulder and heel portions of a container according to the present invention.
Figure 12:
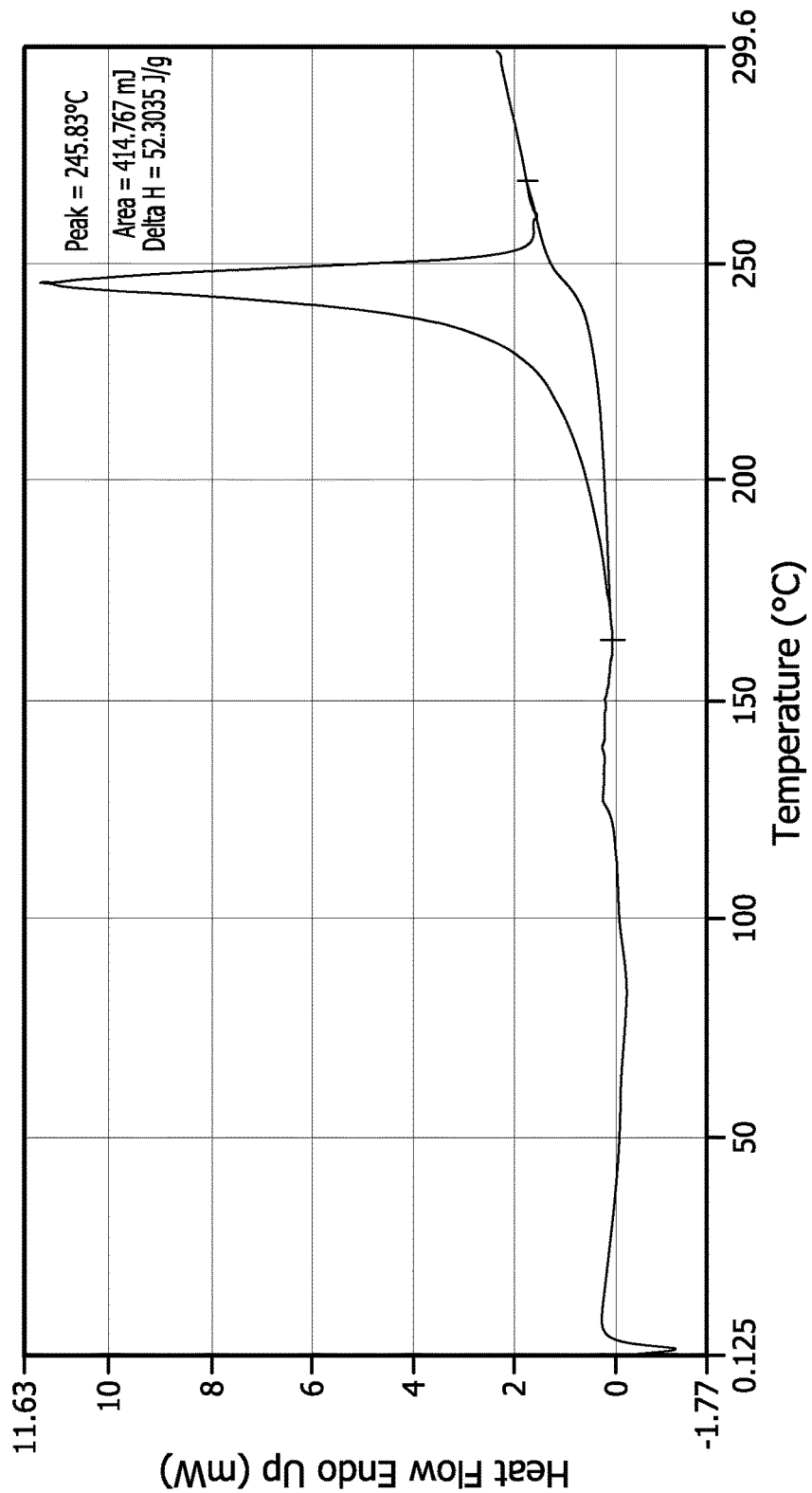
FIG. 12 shows a typical DSC thermogram of PET material forming the barrel portion of a container according to the present invention.

In another preferred form of the invention the first endothermic transition morphosis as well as the second endothermic transition morphosis or an exothermic transition morphosis for a given resin composition such as, for example, ParaStar 9000, are not present at all in the range of between 20° C. and 200° C., and are replaced with an oversized melting peak showing an enthalpy change of at least about +40 J/g, more preferably between about +40 J/g and about +46 J/g, yet more preferably between about +46 J/g and about +54 J/g, and most preferably greater than about +54 J/g. For example, FIG. 11 shows a typical DSC thermogram of PET material forming the shoulder and heel portions of a container according to the present invention. Glass transition and cold crystallization morphosis are absent and an enlarged melting peak has a long low temperature ramp starting at about 200° C. and having an enthalpy change at about 44 J/g. Similarly, FIG. 12 shows a typical DSC thermogram of PET material forming the barrel portion of a container according to the present invention. Glass transition and cold crystallization morphosis are absent and an enlarged melting peak has a long low temperature ramp starting at about 175° C. and having an enthalpy change at about 52 J/g. As used herein, the term "enthalpy change" refers to the amount of energy released (exothermic, negative) or absorbed (endothermic, positive) by the substance when the reaction or molecular change occurs.

Figure 13:
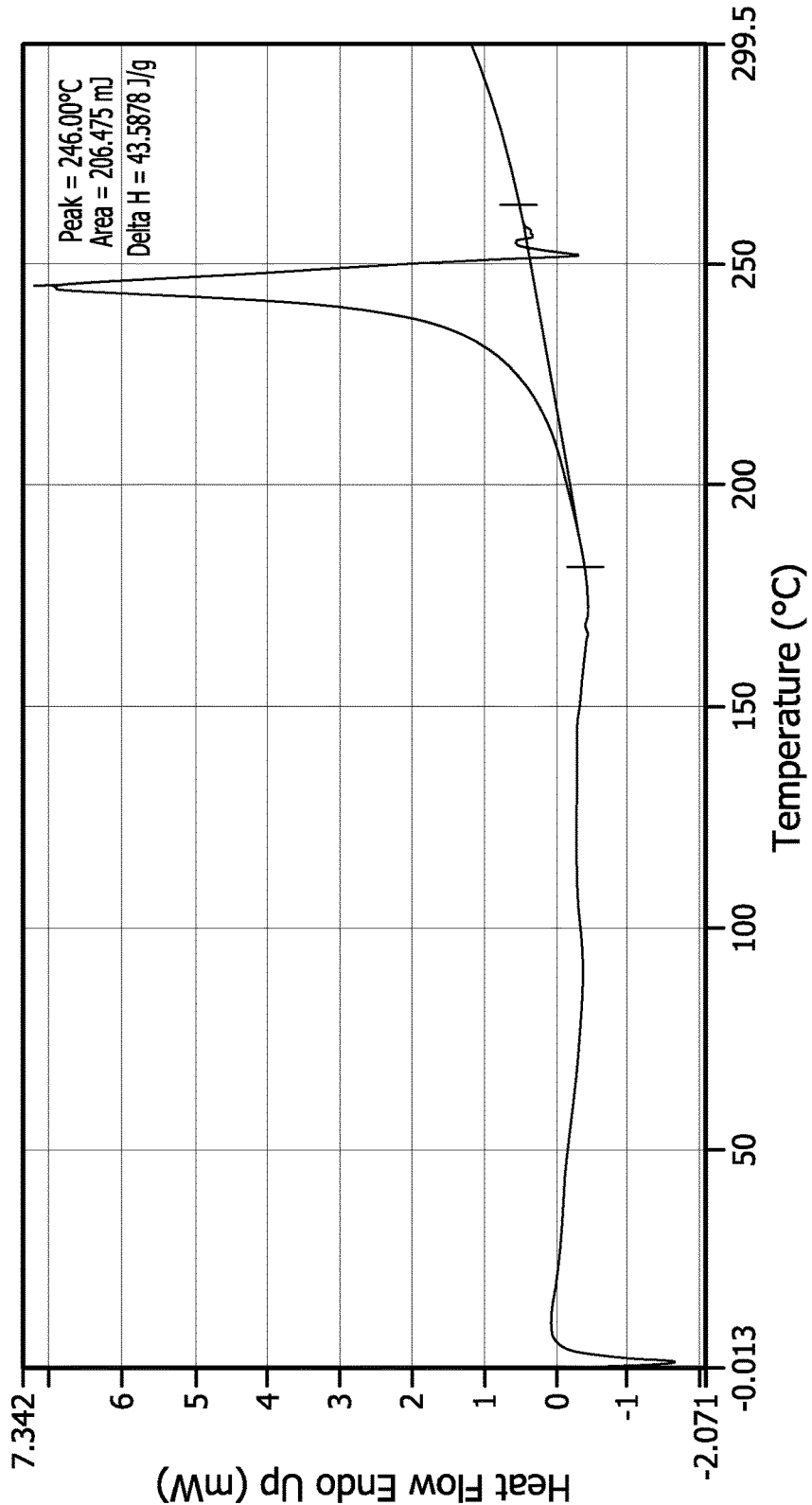
FIG. 13 is a modulated DSC thermogram for a container sample of the present invention.
Figure 14:
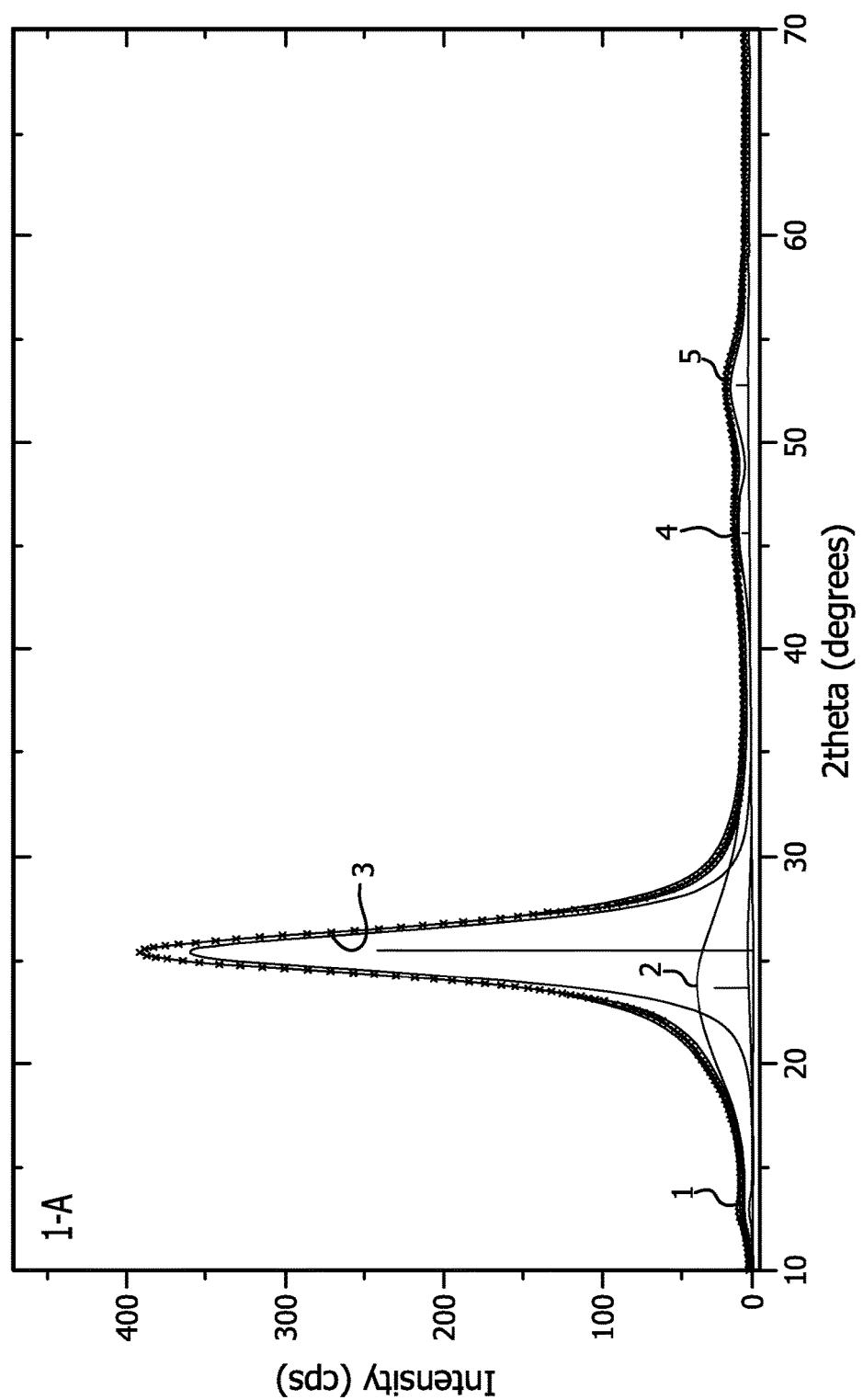
FIGS. 14-18 respectively show the X-ray diffraction patterns for Samples 1-A, 1-B, 3-A, 3-B and 3-C.
Figure 15:
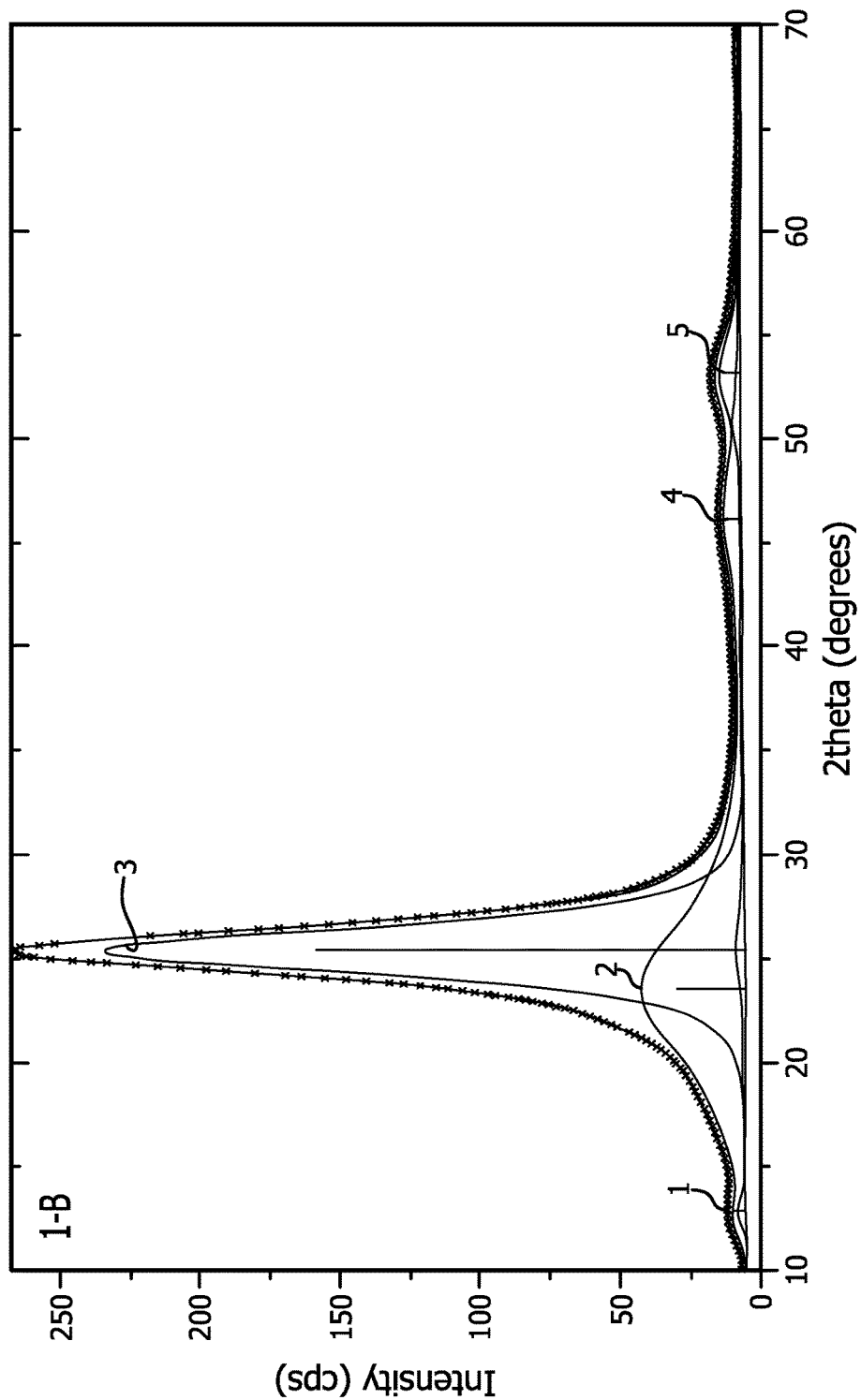
Figure 16:
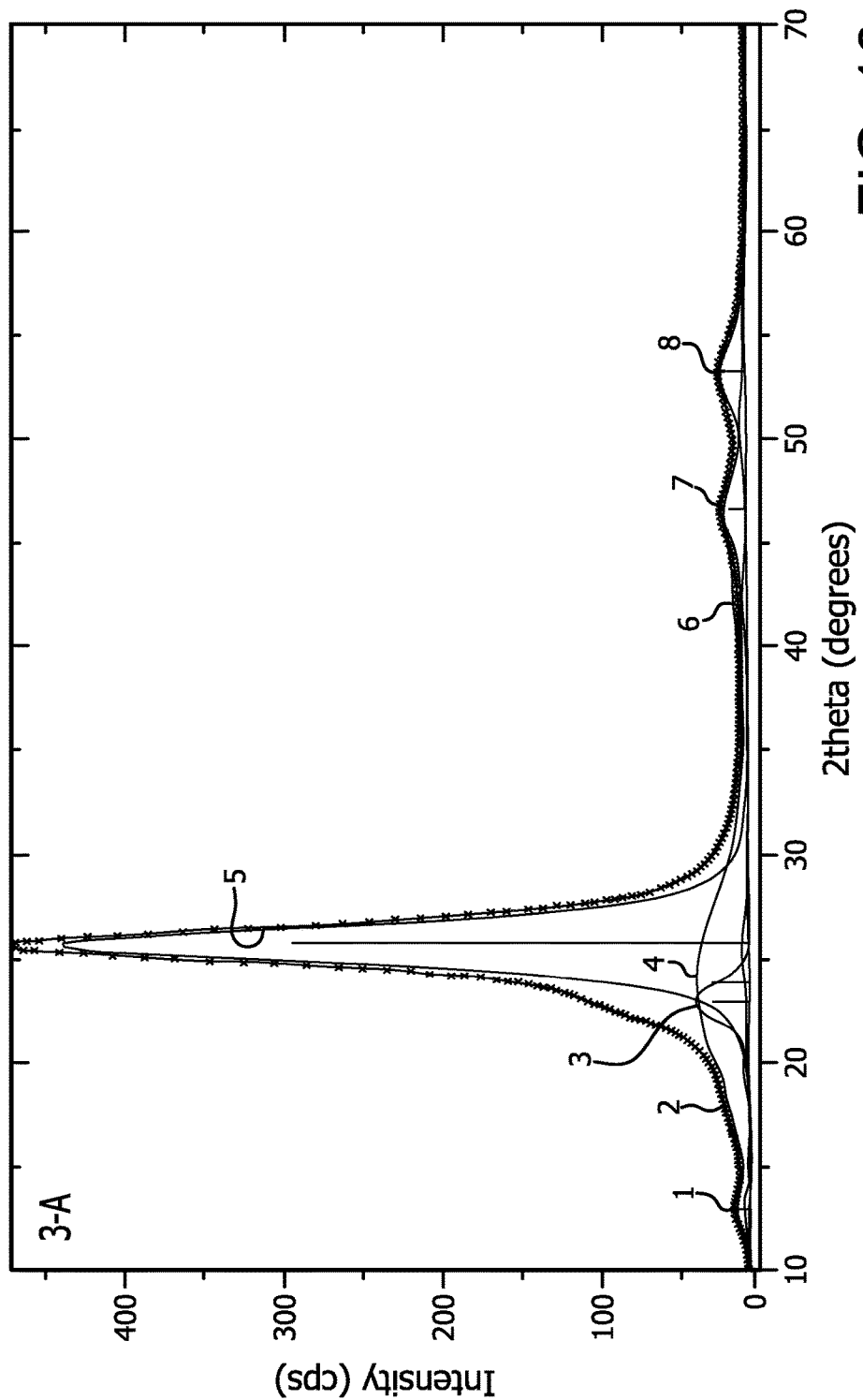

The data also show the change in heat capacity of the glass transition temperature for container samples taken from the barrel section of the container (which constitutes 80% of the surface area of the container) of the present invention is at least less than about 0.10 J/g° C. (FIG. 13).

The data also show the enthalpy of the second endothermic transition for container samples of the present invention, if present, is greater than about 0.50 J/g, more preferably greater than about 1.00 J/g, even more preferably greater than about 1.50 J/g and most preferably greater than about 2.00 J/g.

None of the prior art PET container samples tested showed a second endothermic transition in their MDSC plots. Without intending to be bound by any particular theory, the proposed explanation for this observed difference is associated with the morphological architecture of the resin wherein the macromolecules are tightly packed by the forces applied to the polymer during blow molding and inducing strain driven motion of the macromolecules thus preventing them from forming lamellae or globular formations but are grossly stretched in at least two principal directions parallel to the axils of orientation developed during blow molding process.

Samples of the prior art PET containers and containers of the present invention were subjected to X-ray diffraction analysis. Small sections were cut from each sample and flattened by hand. Each sample was then loaded onto a zero background holder and placed into a Panalytical X'Pert MPD Pro diffractometer using Cu radiation at 54 KV/40 mA. Scans were run over the range of 10°-70° with a step size of 0.0158° and a counting time of 250 seconds per step. FIGS. 14-18 respectively show the diffraction patterns for Samples 1-A, 1-B, 3-A, 3-B and 3-C. Peaks 1, 3, 4 and 5 are generally attributable to the crystalline phase and Peak 2 is generally attributable to the amorphous phase. Crystalline peaks have half widths in the range of 0.1° to 3° and amorphous peaks have half widths close to 10.

The crystalline and amorphous peaks shown in FIGS. 14-18 were separated and recorded for each sample in Table 5. Notably, the data show a greater number of crystalline peaks in the container samples of the present invention when compared to those of the prior art container samples. Further, there is a shift in the peak position as shown in FIG. 19 and in Tables 6A and 6B below.

TABLE 5

% Crystallinity in the PET bottle samples.

| | Number of Crystalline Peaks | PET Crystalline | PET Amorphous |
|---|---|---|---|
| #1-A | 4 | 30.9% | 69.1% |
| #1-B | 4 | 31.4% | 68.6% |
| #3-A | 6 | 21.3% | 78.7% |
| #3-B | 6 | 23.6% | 76.4% |
| #3-C | 6 | 19.7% | 80.3% |

TABLE 6A

XRD Peak Positions Prior Art Samples

| | Peak Positions (°) | | | |
|---|---|---|---|---|
| | #1 | #3 | #4 | #5 |
| #1-A | 13.03° | 25.54° | 46.19° | 53.03° |
| #1-B | 12.84° | 25.43° | 46.13° | 53.17° |

TABLE 6B

XRD Peak Positions (°) of Container Samples of the present invention

| Sample | #1 | #2 | #3 | #5 | #6 | #7 | #8 |
|---|---|---|---|---|---|---|---|
| #3-A | 12.90° | 17.44° | 22.5° | 25.76° | 42.25° | 46.63° | 53.26° |
| #3-B | 12.99° | 17.44° | 22.5° | 25.94° | 42.25° | 46.70° | 53.38° |
| #3-C | 12.90° | 17.44° | 22.5° | 25.64° | 42.25° | 46.49° | 53.23° |

Figure 17:
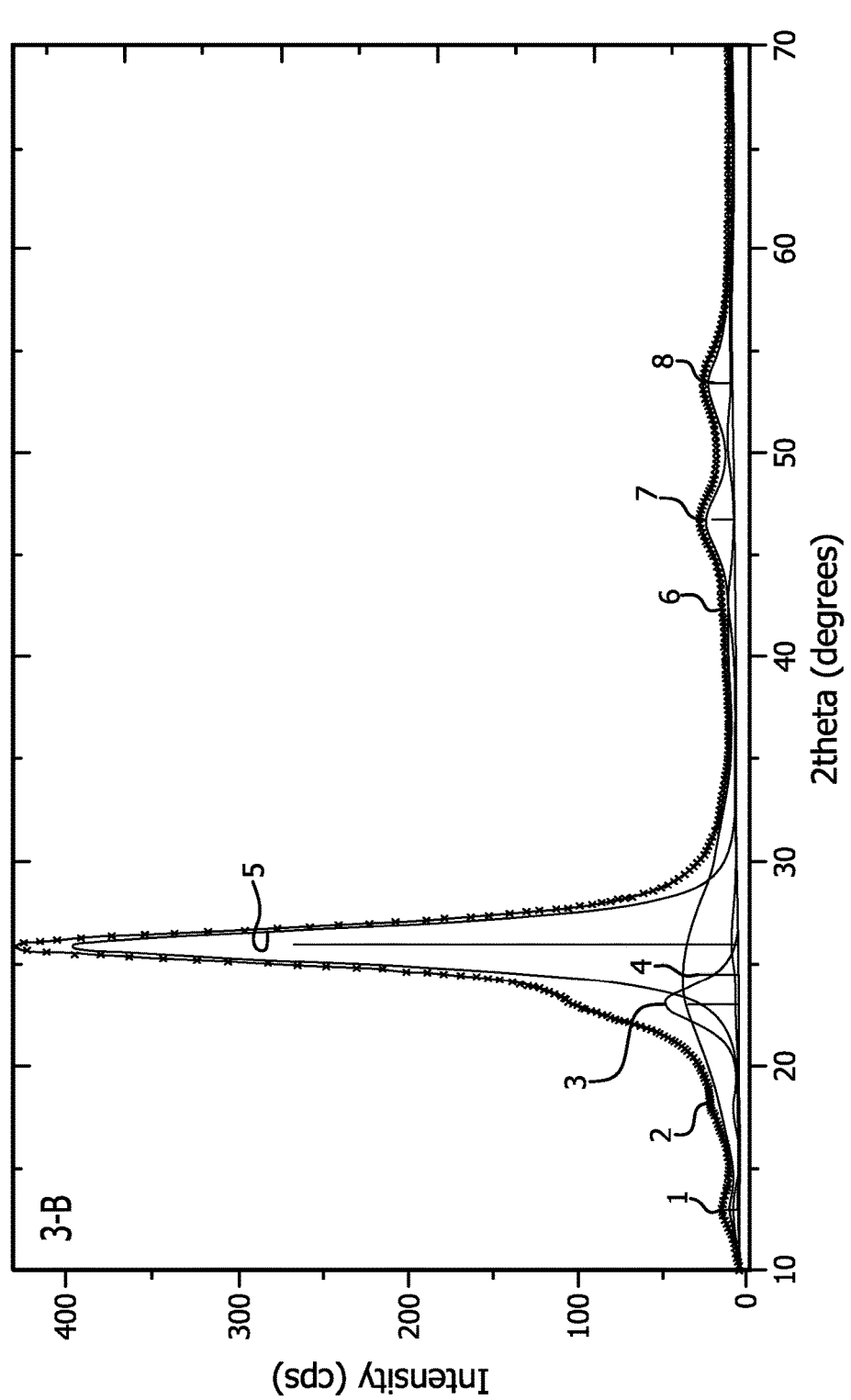
Figure 18:
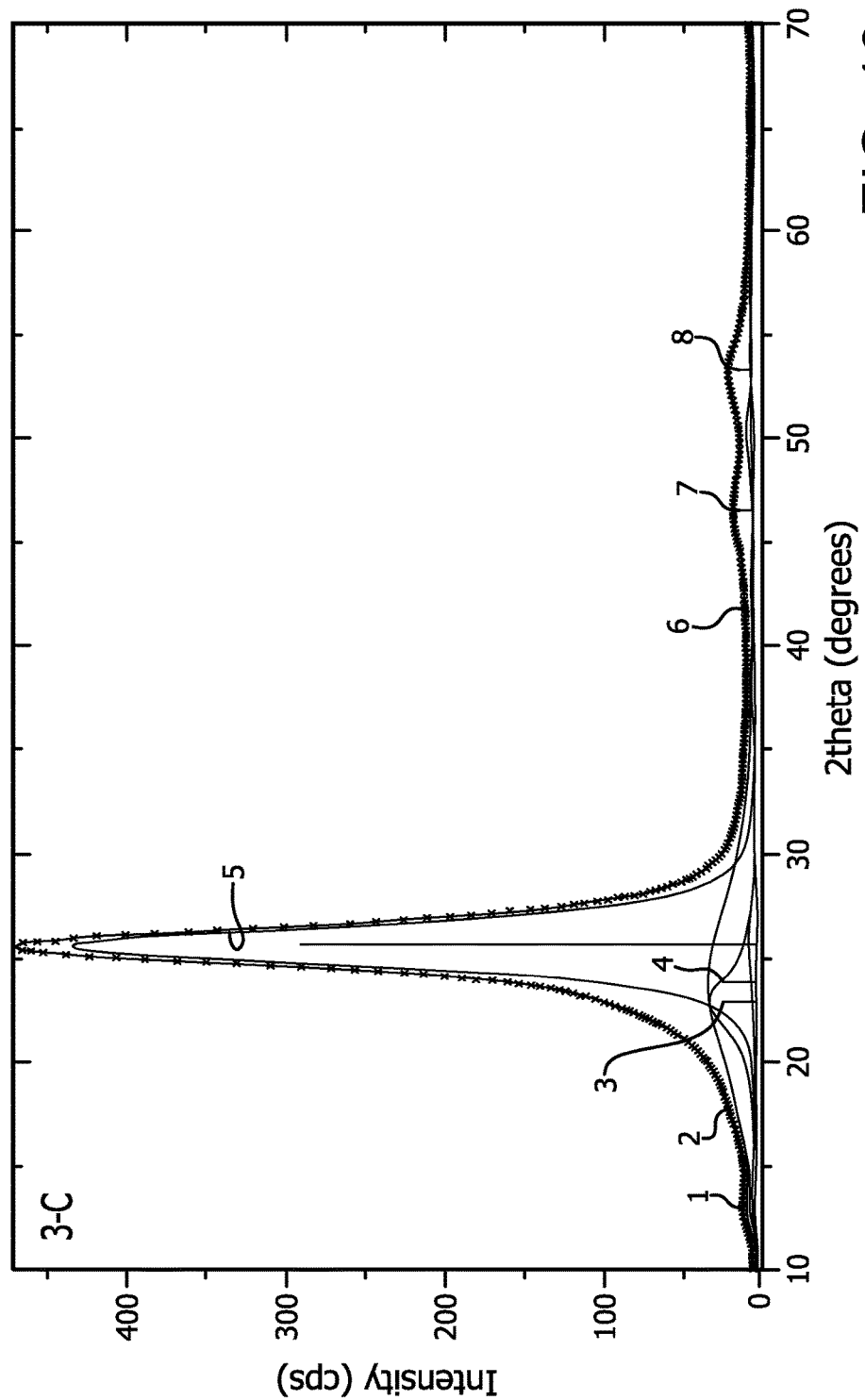
Figure 19:
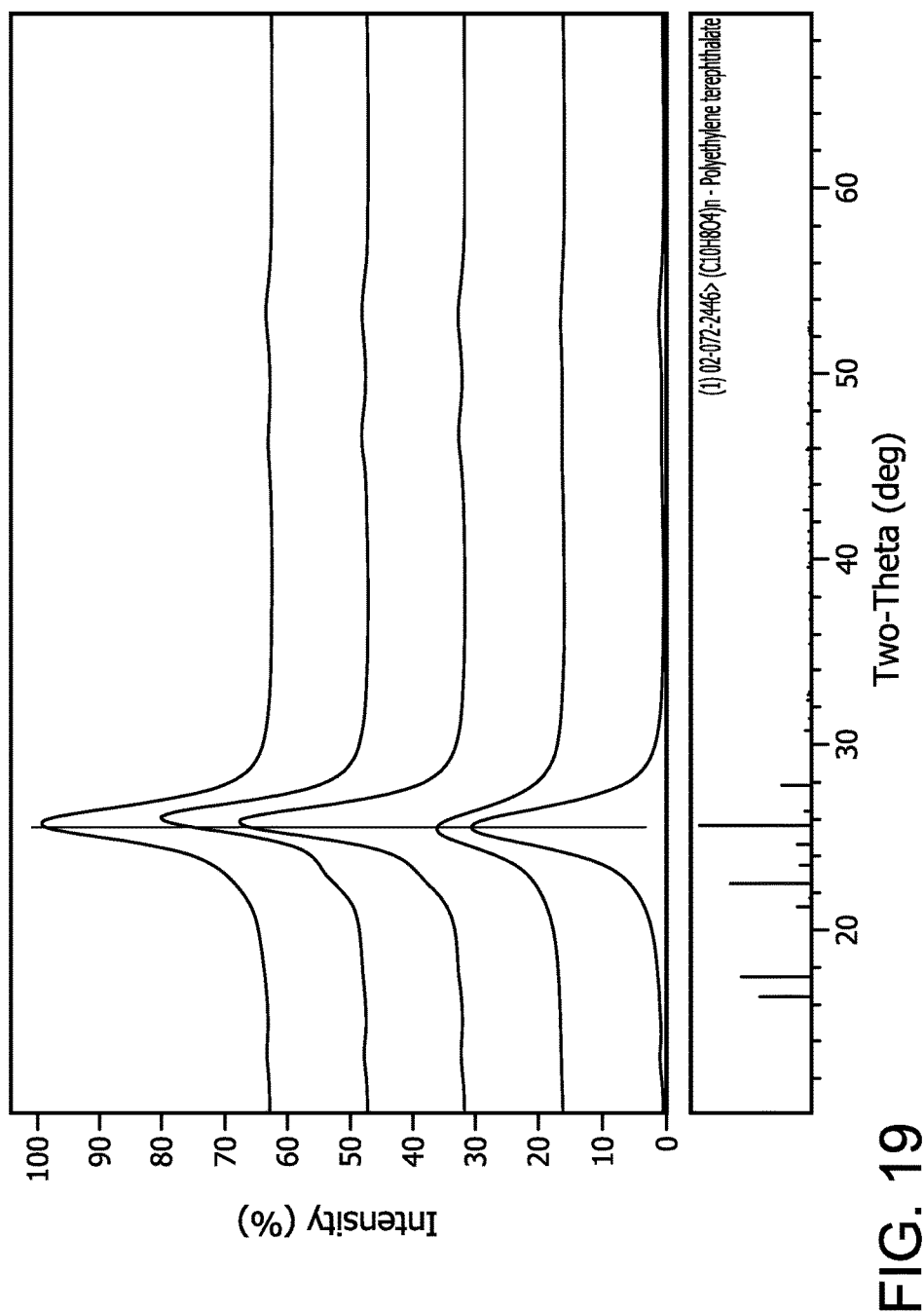
FIG. 19 shows a portion of X-ray diffraction patterns for the tested samples and vertically spaced from one another for clarity purposes.

In a preferred form of the invention, the XRD peaks characterizing the PET containers of the present invention will show at least five crystalline peaks and even more preferably at least six crystalline peaks (FIGS. 17-19). Crystalline peaks 110 can be distinguished from amorphous peaks 112 by the relative shape of the peaks with the crystalline peaks being tall and narrow and the amorphous peaks being rounded and short. Typically a crystalline peak will have a FWHM of from about 1.5° to about 3° and an amorphous peak will have a FWHM of about 9° to about 10°. The term FWHM refers to the breadth of a diffraction peak at half the maximum intensity in radians. Two crystalline peaks or inflection points observed in XRD plots of container samples of the present invention but not found in the prior art container samples were found at nominal values of 17.44° and 42.25°.

Further, as shown in FIG. 19, the XRD peak positions of the present invention are shifted from those shown in the prior art samples. While the shifts between the prior art Samples Series 1 and those of the present invention Series 3 may not seem large, they are well beyond the typical experimental errors. Of particular note is the fact that some peaks are fixed while others shift by 0.5° or more. The most common experimental error would have caused all of the peaks to shift by the same amount. Since this is not the case here, experimental error can be ruled out as the cause of the shift. The XRD data indicate a difference in the crystalline phase between the prior art container samples and those of the present invention.

As shown in Tables 5 and 7, the containers of the present invention will have a combination of low crystallinity and high density. In a preferred form of the invention the crystallinity of the container will be from about 30%, more preferably less than about 28%, even more preferably less than about 25%. In another preferred form of the invention the crystallinity will be from about 30% to about 15%, more preferably from 28% to about 18% and most preferably from about 25% to about 18%. In a preferred form of the present invention, the density will be greater than about 1.370 g/cc and more preferably greater than about 1.375 g/cc. The density of the prior art container samples and those of the present invention were measured and the results are set forth in Table 6 below.

TABLE 7

Density analysis results of PET bottle samples

| Sample Description | Specimen # | Density (g/cc) |
|---|---|---|
| Sample #1-A (24 oz) | 1 | 1.36 |
| | 2 | 1.37 |
| | Average | 1.37 |
| Sample #1-B (24 oz) | 1 | 1.36 |
| | 2 | 1.37 |
| | Average | 1.37 |
| Sample #3-A (24 oz) | 1 | 1.38 |
| | 2 | 1.38 |
| | Average | 1.38 |
| Sample #3-B (24 oz) | 1 | 1.38 |
| | 2 | 1.38 |
| | Average | 1.38 |
| Sample #3-C (45 oz) | 1 | 1.38 |
| | 2 | 1.38 |
| | Average | 1.38 |

PET containers of the present invention are also characterized by lower moisture uptake—as much as 24% lower than containers made by prior art heat set processes. For example, PET containers of the present invention made from ParaStar 9000 resin when exposed to ambient conditions (i.e., 22-27° C. and 50% relative humidity), generally reaching equilibrium have a moisture content of from about 1850 ppm to about 1930 ppm, more preferably less than or equal to about 1850 ppm, and most preferably less than or equal to about 1780 ppm. When exposed to hot-fill conditions (about 96° C., 100% RH) and/or pasteurization conditions (98° C., 100% RH), PET containers of the present invention made from ParaStar 9000 resin preferably have a moisture content of from about 1780 ppm to about 1980 ppm, and most preferably less than or equal to about 1780 ppm.

To determine this, several tests were performed on a 24 oz container made from ParaStar 9000 resin according to the present invention (as detailed above) and on a prior art heat set container. The first test was an ambient test, which involved allowing the containers to equilibrate empty under ambient conditions (i.e., 22-27° C. and 50% relative humidity) for 4 days. The second test was a hot-fill simulation test, which involved filling the bottles with 205° F. tap water (measured at the source) after having been stored under ambient conditions for four days. The containers were flood filled with minimum head space and capped immediately after filling, held for 5 minutes, then cooled with 70° F. water in a commercial lab-scale pressure cooker combine. For moisture content analysis, 1" by 2" pieces were cut from the barrel portion of the container where no complicating elements such as ribs or pressure folds were present, specimens were protected from being affected further by the ambient air. Analysis was performed on a Karl Fischer titration analyzer. The results of the moisture content analysis are listed in Tables 8 and 9.

TABLE 8

| | Moisture content, mg/g, at ambient conditions | | |
|---|---|---|---|
| | Minimum content | Average | Maximum content |
| Heat Set | 2.12 | 2.30 | 2.48 |
| ThermaSet | 1.78 | 1.86 | 1.93 |
| % Difference | 19% | 24% | 28% |

TABLE 9

| | Moisture content, mg/g, after hot fill and pasteurization | | |
|---|---|---|---|
| | Minimum content | Average | Maximum content |
| Heat Set | 2.14 | 2.17 | 2.19 |
| ThermaSet | 1.78 | 1.79 | 1.82 |
| % Difference | 20% | 21% | 20% |

The results listed in Table 8 show that PET containers made according to the present invention have about 24% less moisture than the prior art heat-set containers. Without intending to be bound by particular theory, the low moisture uptake of the PET containers of the present invention is most likely the result of less free volume in the PET network due to the strain induced formation described above.

Figure 20:
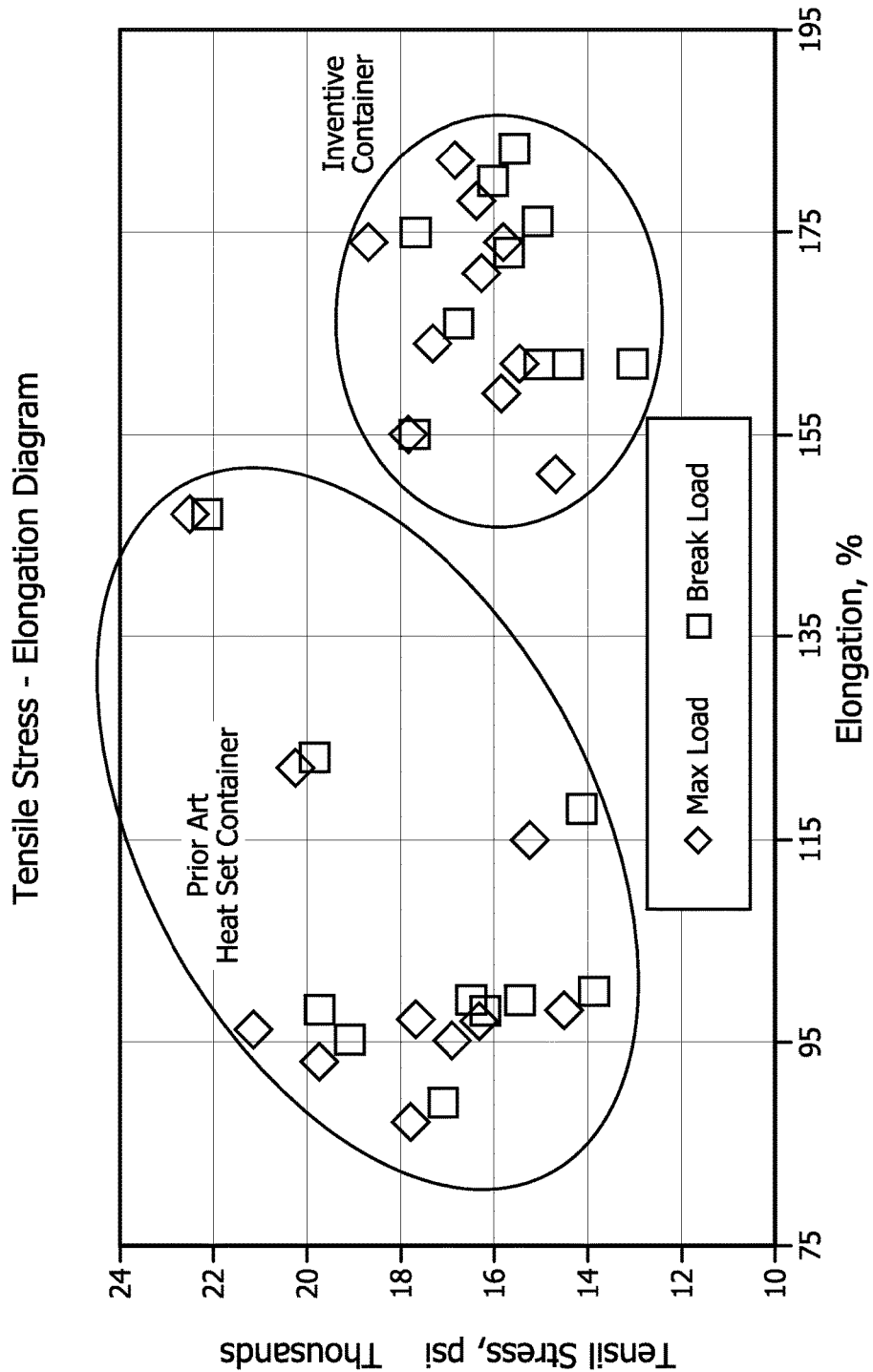
FIG. 20 is a diagram illustrating the tensile strength versus elongation characteristics of a PET container made according to the present invention compared to a prior art heat-set PET container.

PET containers of the present invention having low moisture uptake are also characterized by superior mechanical properties. For example, referring now to FIG. 20, a tensile stress versus elongation diagram is shown for the prior art heat set PET container compared to the PET container of the present invention. FIG. 20 shows that the tensile strength for the PET container of the present invention exposed to ambient conditions varies from about 14,000 psi to 18,000 psi, with an average at about 17,000 psi. The same material tested after hot fill and pasteurization exhibited a slight increase in tensile strength within the range of between 16,000 psi and 20,000 psi, with an average at about 17,000 psi. The prior art heat set containers exhibited a tensile strength range of from between about 14,000 psi and 19,000 psi, with an average of about 16,000 psi. After hot fill and pasteurization, the tensile strength range of the prior art heat set containers widened to from about 15,000 psi to about 26,000 psi, with an average exceeding 20,000 psi.

At the same time FIG. 20 shows that the load properties at yield of the PET container according to the present invention exposed to ambient conditions vary from 52 lbf to 70 lbf, with an average of 60 lbf. In comparison, the prior art heat set container deviates between 48 lbf and 73 lbf, with an average of 56 lbf, thus showing greater deviation (lesser performance stability). The elongation (strain) percent for the 24 oz PET container according to the present invention varies between 145% and 170%, with an average of about 160%. In comparison, the 740 cc prior art heat set container exhibits an elongation range of from 75% to 125%, with average of about 96%. This shows superior elastic properties of the containers of the present invention that is maintained for a longer period of time compared to the prior art heat set containers. This trend continuous when the materials exposed to the hot fill application and pasteurization. All characteristics were measured in vertical principal direction in accordance to ASTM test method D638.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. While the invention is described with respect to a wide mouth container, the function of the panel curvatures according to the invention should work with a standard finish (i.e., not a wide mouth neck with a finish). It is therefore to be understood that, within the scope of the claims and their equivalents, the invention may be practiced otherwise than as specifically described.

We claim:

1. A process for forming a blow molded PET plastic containers on a blow molding machine, wherein the blow molded PET plastic containers have enhanced thermal properties, the process comprising the steps of:
   at an injection mold station, injecting a molten PET resin into an injection mold cavity to form a preform;
   removing the preform while the preform is at a temperature of from about 75° C. to about 130° C.;
   conveying the preform to at least one conditioning station at a rate such that the temperature of the preform does not decrease more than 5° C.;
   conditioning the preform by selectively heating at least one portion of the preform selected from the group consisting of: neck forming portion, barrel forming portion, base forming portion, and heel forming portion, to define a conditioned preform;
   conveying the conditioned preform to a blow mold station at a rate such that the temperature of the surface of the preform does not decrease more than 5° C.;
   inserting the conditioned preform into a blow mold having walls that define a blow cavity that defines a shape of a finished article, wherein the mold has at least three temperature zones along an axis of the mold all of which are above the glass transition temperature of PET;
   blowing the preform into a finished PET container by a stretch blow molding process comprising the steps of:
      i. inserting an elongated stretch blow rod into the conditioned preform to contact a bottom portion of the conditioned preform thereby providing a downward pressure to stretch the conditioned preform to a base portion of the mold;
      ii. simultaneously injecting low pressure air into the conditioned preform at a pressure of from about 100 psi to about 200 psi to form a pre-blown preform; and
      iii. immediately after ii, injecting high pressure air at a pressure of from about 400 psi to 600 psi into the pre-blown preform to expand the pre-blown preform against the mold walls to form the finished container;
   holding the finished container in the mold for a time period of from about 2 seconds to about 20 seconds;
   releasing the finished container from the mold wherein the temperature of the finished container is from about 80° C. to about 170° C.; and allowing the finished container to cool to ambient temperature, wherein the process is performed on an integrated system wherein the blow molding machine has both the injection mold station and the blow mold station on one platform, wherein the preform is designed such that a density ratio of the finished container relative to the preform is in a range of from about 1.025 to about 1.049.

2. The process of claim 1 wherein the PET resin has an intrinsic viscosity of from about 0.72 dL/g to about 0.86 dL/g.

3. The process of claim 1 wherein the preform is designed such that its thickness ratio relative to the finished container is in the range of from about 2.0 to about 7.5.

4. The process of claim 3 wherein the thickness ratio is from about 4.0 to about 6.0.

5. The process of claim 1 wherein the preform is designed such that its thickness ratio relative to the finished container is in the range of from about 3.4 to about 4.2 in the shoulder portion of the container; from about 3.8 to about 4.5 in the barrel portion of the container; and from about 2.4 to about 2.8 in the base portion of the container.

6. The process of claim 1 wherein the temperature of the preform when it is removed from the injection mold cavity is from about 90° C. to about 105° C.

7. The process of claim 1 wherein the preform, when it is removed from the injection mold cavity, exhibits a temperature gradient from an outside to an inside surface of not more than 5° C.

8. The process of claim 1 wherein the temperature of the preform when it is removed from the injection mold cavity is from about 80° C. to about 110° C.

9. The process of claim 1 wherein the conditioning step comprises heating specific areas comprising at least the neck forming, barrel forming, heel forming, and base forming zones of the preform to achieve a temperature gradient in the specific areas of as much as about 20° C.

10. The process of claim 9 wherein the conditioning step comprises heating specific areas comprising at least the neck forming, barrel forming, heel forming, and base forming zones of the preform to achieve a temperature gradient in the specific areas of as much as about 30° C.

11. The process of claim 10 wherein the conditioning step comprises heating specific areas comprising at least the neck forming, barrel forming, heel forming, and base forming zones of the preform to achieve a temperature gradient in the specific areas of as much as about 40° C.

12. The process of claim 1 wherein the temperature of the mold is from about 73° C. to about 250° C.

13. The process of claim 12 wherein the temperature of the mold is from about 150° C. to about 240° C.

14. The process of claim 13 wherein the temperature of the mold is from about 160° C. to about 230° C.

15. The process of claim 1 wherein the at least 3 temperature zones of the mold comprise: zone 1 corresponding to a portion of the mold corresponding to a top portion of the finished container at a temperature of from about 73° C. to about 120° C.; zone 2 corresponding to a portion of the mold corresponding to a finish portion of the finished container at a temperature of from about 160° C. to about 240° C.; zones 3 and 5 corresponding to portions of the mold corresponding to a shoulder portion and a heal portion of the finished container at a temperature of from about 150° C. to about 230° C.; zone 4 corresponding to a portion of the mold corresponding to a barrel portion of the finished container at a temperature of from about 190° C. to about 250° C.; and zone 6 corresponding to a portion of the mold corresponding to a bottom portion of the finished container at a temperature of from about 100° C. to about 230° C.

16. The process of claim 1 wherein the mold has a bottom portion that is mounted for reciprocating translational movement.

17. The process of claim 1 wherein the finished container is held in the mold for a time period of from about 2 to about 15 seconds.

18. The process of claim 17 wherein the finished container is held in the mold for a time period of from about 2 to about 12 seconds.

19. The process of claim 18 wherein the finished container is held in the mold for a time period of from about 6 to about 12 seconds.

20. A process for forming a blow molded PET plastic containers on a blow molding machine, wherein the blow molded PET containers have enhanced thermal properties, the process comprising the steps of:

at an injection mold station, injecting a molten PET resin into an injection mold cavity to form a preform;

removing the preform while the preform is at a temperature of from about 75° C. to about 130° C.;

conveying the preform to at least one conditioning station at a rate such that the temperature of the preform does not decrease more than 5° C.;

conditioning the preform by selectively heating at least one portion of the preform selected from the group consisting of: neck forming portion, barrel forming portion, base forming portion, and heel forming portion, to define a conditioned preform;

conveying the conditioned preform to a first blow mold station at a rate such that the temperature of the surface of the preform does not decrease more than 5° C.;

inserting the conditioned preform into a first blow mold having walls that define a blow cavity that defines a shape of a finished article and a first volume, wherein the first mold has at least three temperature zones along an axis of the first mold all of which are above the glass transition temperature of PET;

blowing the preform into a finished PET container by a stretch blow molding process comprising the steps of:

i. inserting an elongated stretch blow rod into the conditioned preform to contact a bottom portion of the conditioned preform thereby providing a downward pressure to stretch the conditioned preform to a base portion of the first mold;

ii. simultaneously injecting low pressure air into the conditioned preform at a pressure of from about 100 psi to about 200 psi to form a pre-blown preform; and iii. immediately after ii, injecting high pressure air at a pressure of from about 400 psi to 600 psi into the pre-blown preform to expand the pre-blown preform against the walls of the first mold to form an intermediate container;

iv. holding the intermediate container in the mold for a time period of from about 2 seconds to about 20 seconds;

v. releasing the intermediate container from the mold wherein the temperature of the finished container is from about 80° C. to about 125° C.;

vi. conveying the intermediate container to a second mold having walls that define a blow cavity that defines a shape of a finished article and a second volume, wherein the second mold has at least three temperature zones along an axis of the second mold all of which are above the glass transition temperature of PET, and wherein the second volume is the same as the first volume;

vii. inserting an elongated stretch blow rod into the intermediate container to contact a bottom portion of the intermediate container thereby providing a downward pressure to stretch the intermediate container to a base portion of the second mold and injecting high pressure air at a pressure of from about 400 psi to 600 psi into the intermediate container to expand the intermediate container against the walls of the second mold to form the finished container;

viii. directing a cooling fluid to an inner surface of the finished container;

ix. releasing the finished container from the second mold, wherein the finished container is at a temperature of from about 80° C. to about 170° C.; and x. allowing the finished container to cool to ambient temperature, wherein the process is performed on an integrated system wherein the blow molding machine has both the injection mold station and the blow mold station on one platform, wherein the preform is designed such that a density ratio of the finished container relative to the preform is in a range of from about 1.025 to about 1.049.

21. The process of claim 20 wherein the PET resin has an intrinsic viscosity of from about 0.72 dL/g to about 0.86 dL/g.

22. The process of claim 20 wherein the preform is designed such that its thickness ratio relative to the finished container is in the range of from about 2.0 to about 7.5.

23. The process of claim 22 wherein the thickness ratio is from about 4.0 to about 6.0.

24. The process of claim 20 wherein the preform is designed such that its thickness ratio relative to the finished container is in the range of from about 3.4 to about 4.2 in the shoulder portion of the container; from about 3.8 to about 4.5 in the barrel portion of the container; and from about 2.4 to about 2.8 in the base portion of the container.

25. The process of claim 20 wherein the temperature of the preform when it is removed from the injection mold cavity is from about 90° C. to about 105° C.

26. The process of claim 20 wherein the preform, when it is removed from the injection mold cavity, exhibits a temperature gradient from an outside to an inside surface of not more than 5° C.

27. The process of claim 20 wherein the temperature of the preform when it is removed from the injection mold cavity is from about 80° C. to about 110° C.

28. The process of claim 20 wherein the conditioning step comprises heating specific areas comprising at least the neck forming, barrel forming, heel forming, and base forming zones of the preform to achieve a temperature gradient in the specific areas of as much as about 20° C.

29. The process of claim 28 wherein the conditioning step comprises heating specific areas comprising at least the neck forming, barrel forming, heel forming, and base forming zones of the preform to achieve a temperature gradient in the specific areas of as much as about 30° C.

30. The process of claim 29 wherein the conditioning step comprises heating specific areas comprising at least the neck forming, barrel forming, heel forming, and base forming zones of the preform to achieve a temperature gradient in the specific areas of as much as about 40° C.

31. The process of claim 20 wherein the temperature of the first mold is from about 73° C. to about 250° C.

32. The process of claim 31 wherein the temperature of the first mold is from about 150° C. to about 240° C.

33. The process of claim 32 wherein the temperature of the first mold is from about 160° C. to about 230° C.

34. The process of claim 20 wherein the at least 3 temperature zones of the first mold comprise: zone 1 corresponding to a portion of the mold corresponding to a top portion of the finished container at a temperature of from about 73° C. to about 120° C.; zone 2 corresponding to a portion of the mold corresponding to a finish portion of the finished container at a temperature of from about 160° C. to about 240° C.; zones 3 and 5 corresponding to portions of the mold corresponding to a shoulder portion and a heal portion of the finished container at a temperature of from about 150° C. to about 230° C.; zone 4 corresponding to a portion of the mold corresponding to a barrel portion of the finished container at a temperature of from about 190° C. to about 250° C.; and zone 6 corresponding to a portion of the mold corresponding to a bottom portion of the finished container at a temperature of from about 100° C. to about 230° C.

35. The process of claim 20 wherein the first mold has a bottom portion that is mounted for reciprocating translational movement.

36. The process of claim 20 wherein the finished container is held in the first mold for a time period of from about 2 to about 15 seconds.

37. The process of claim 36 wherein the finished container is held in the first mold for a time period of from about 2 to about 12 seconds.

38. The process of claim 37 wherein the finished container is held in the first mold for a time period of from about 6 to about 12 seconds.

39. The process of claim 34 wherein the at least 3 temperature zones of the second mold comprise: zone 1 corresponding to a portion of the mold corresponding to a top portion of the finished container at a temperature of from about 73° C. to about 120° C.; zone 2 corresponding to a portion of the mold corresponding to a finish portion of the finished container at a temperature of from about 160° C. to about 240° C.; zones 3 and 5 corresponding to portions of the mold corresponding to a shoulder portion and a heal portion of the finished container at a temperature of from about 150° C. to about 230° C.; zone 4 corresponding to a portion of the mold corresponding to a barrel portion of the finished container at a temperature of from about 190° C. to about 250° C.; and zone 6 corresponding to a portion of the mold corresponding to a bottom portion of the finished container at a temperature of from about 100° C. to about 230° C.

40. The process of claim 20 wherein the cooling fluid is air.

41. The process of claim 40 wherein the air is at a temperature of from about 20° C. to about 50° C.

42. The process of claim 1 wherein the preform maintains a moisture content of less than 30 ppm from when it is injection molded to when it is blown into a container.

43. The process of claim 20 wherein the preform maintains a moisture content of less than 30 ppm from when it is injection molded to when it is blown into a container.

* * * * *